(12) United States Patent
Nishio

(10) Patent No.: US 7,463,426 B2
(45) Date of Patent: Dec. 9, 2008

(54) IMAGE PICKUP APPARATUS

(75) Inventor: Akihiro Nishio, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/950,232

(22) Filed: Dec. 4, 2007

(65) Prior Publication Data
US 2008/0130131 A1    Jun. 5, 2008

(30) Foreign Application Priority Data
Dec. 5, 2006    (JP)    .............. 2006-328098

(51) Int. Cl.
G02B 15/14    (2006.01)

(52) U.S. Cl. .............. 359/683; 359/684; 359/685; 359/686; 359/687; 359/688; 359/689; 359/690; 359/713; 359/714; 359/715; 359/716; 359/726; 359/737

(58) Field of Classification Search ......... 359/683–690, 359/713–716, 726, 737
See application file for complete search history.

(56) References Cited

U.S. PATENT DOCUMENTS 5,587,739 A    12/1996    Suzuki 6,771,432 B2    8/2004    Mihara
6,850,373 B2    2/2005    Mihara
6,975,462 B2    2/2005    Mihara
7,145,730 B2    12/2006    Mihara
7,369,326 B2 *    5/2008    Yagyu et al. .............. 359/689

FOREIGN PATENT DOCUMENTS

| JP | 06-284322 | 10/1994 |
| JP | 2004-37967 | 2/2004 |
| JP | 2004-69808 | 3/2004 |
| JP | 2005-84151 | 3/2005 |
| JP | 2006-106071 | 4/2006 |
| JP | 2006-106117 | 4/2006 |

* cited by examiner

*Primary Examiner*—Evelyn A. Lester
(74) *Attorney, Agent, or Firm*—Canon USA Inc IP Div

(57) ABSTRACT

An image pickup apparatus includes an image pickup element and an optical system configured to form an image on the image pickup element. The optical system includes, in order from an object side to an image side, a first lens unit having a positive refractive power, a second lens unit having a negative refractive power and including a reflecting member configured to deflect an optical axis, and a rear lens unit having a positive refractive power and including at least one lens unit having a positive refractive power. The second lens unit is stationary for zooming. During zooming, the image pickup element moves, and an interval between the first lens unit and the second lens unit and an interval between the second lens unit and the rear lens unit vary.

15 Claims, 18 Drawing Sheets

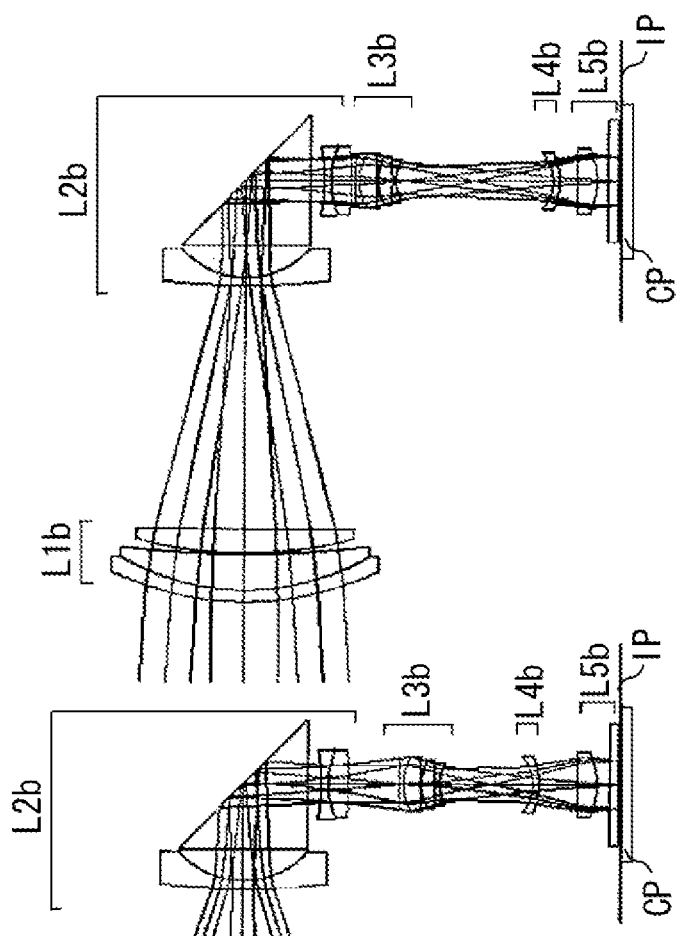
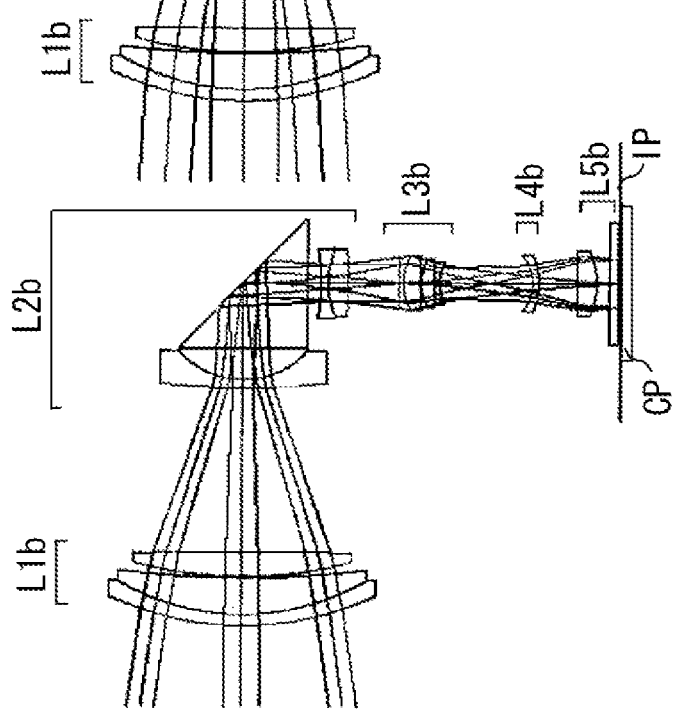
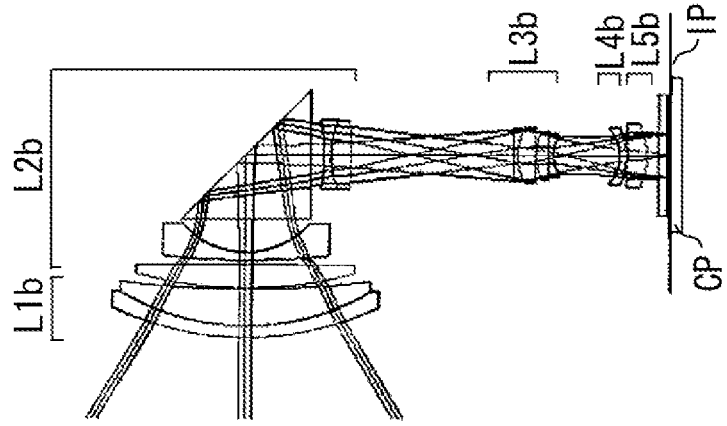

IMAGE PICKUP APPARATUS

BACKGROUND OF THE INVENTION

1. Field of the Invention

The present invention relates to an image pickup apparatus, such as a digital camera or a video camera, using an image pickup element, and to a zoom lens that can be used with an image pickup apparatus.

2. Description of the Related Art

In recent years, image pickup apparatuses, such as digital cameras or video cameras, using an image pickup element for forming an image have required compactness of the entire image pickup apparatus and high quality of the formed image.

It has been desired that image pickup apparatuses, for example, digital cameras, should be compact which leads to portability for users and which are anteroposteriorly thin.

Some zoom lens barrels have been known, which utilize a retractable lens structure (collapsible mount type structure) having high accommodation efficiency so as to reduce the thickness of a camera.

U.S. Pat. No. 6,771,432 discusses a variable magnification image taking device, in which an image pickup element is moved to follow an image forming position, which varies during zooming.

Japanese Patent Application Laid-Open No. 2004-37967 and U.S. Pat. No. 6,771,432 discuss thin cameras (image pickup apparatuses) employing an optical-path-bending optical system, in which a reflecting member is located to deflect an optical axis or path substantially 90°, thus reducing an optical thickness of the optical system in the direction of an object side (i.e., an anteroposterior direction of the optical system).

Japanese Patent Application Laid-Open Nos. 2005-84151 and 2006-106071 discuss zoom lenses employing an optical-path-bending zoom optical system, in which an image pickup element is moved along an optical axis during zooming, thus miniaturizing the entire optical system.

Appropriate setting of conditions for moving each of lens units and an image pickup element in a zoom lens is needed to compensate for movement of an image plane caused by the variation of magnification and to simplify a moving mechanism for moving the lens units during zooming.

However, the number of moving mechanisms is increased in a case where an image pickup element is moved independent of lens units in a thin-shaped optical-path-bending zoom lens (or zoom lens system) in which a reflecting member is located on an optical path of the optical system and an optical axis thereof is bent by the reflecting member to reduce a thickness in an anteroposterior direction of the image pickup apparatus. Further, the moving mechanisms become complex and large.

In order to maintain high optical performance and to reduce the thickness in the anteroposterior direction of the image pickup apparatus, it is useful to locate a reflecting member for bending an optical axis at an appropriate position on an optical path of an optical system and to appropriately select lens units that are movable during zooming.

If conditions for moving a lens unit, which includes the reflecting member, and the image pickup element are not appropriately set in the optical-path-bending zoom optical system, it is difficult to obtain a high variable-magnification zoom optical system having a wide field angle.

SUMMARY OF THE INVENTION

The present invention is directed to an image pickup apparatus that can simplify a moving mechanism for moving lens units during zooming, that can easily miniaturize the entire optical system, and that can be anteroposteriorly thin.

According to an aspect of the present invention, an image pickup apparatus includes an image pickup element and an optical system configured to form an image on the image pickup element. The optical system includes, in order from an object side to an image side, a first lens unit having a positive refractive power, a second lens unit having a negative refractive power and including a reflecting member configured to deflect an optical axis, and a rear lens unit having a positive refractive power and including at least one lens unit having a positive refractive power. The second lens unit is stationary for zooming. During zooming, the image pickup element moves, and an interval between the first lens unit and the second lens unit and an interval between the second lens unit and the rear lens unit vary.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A to 7C illustrate optical paths obtained by bending an optical path of the zoom lens 90° according to the second exemplary embodiment of the present invention.

DETAILED DESCRIPTION OF THE EMBODIMENTS

Figure 1:
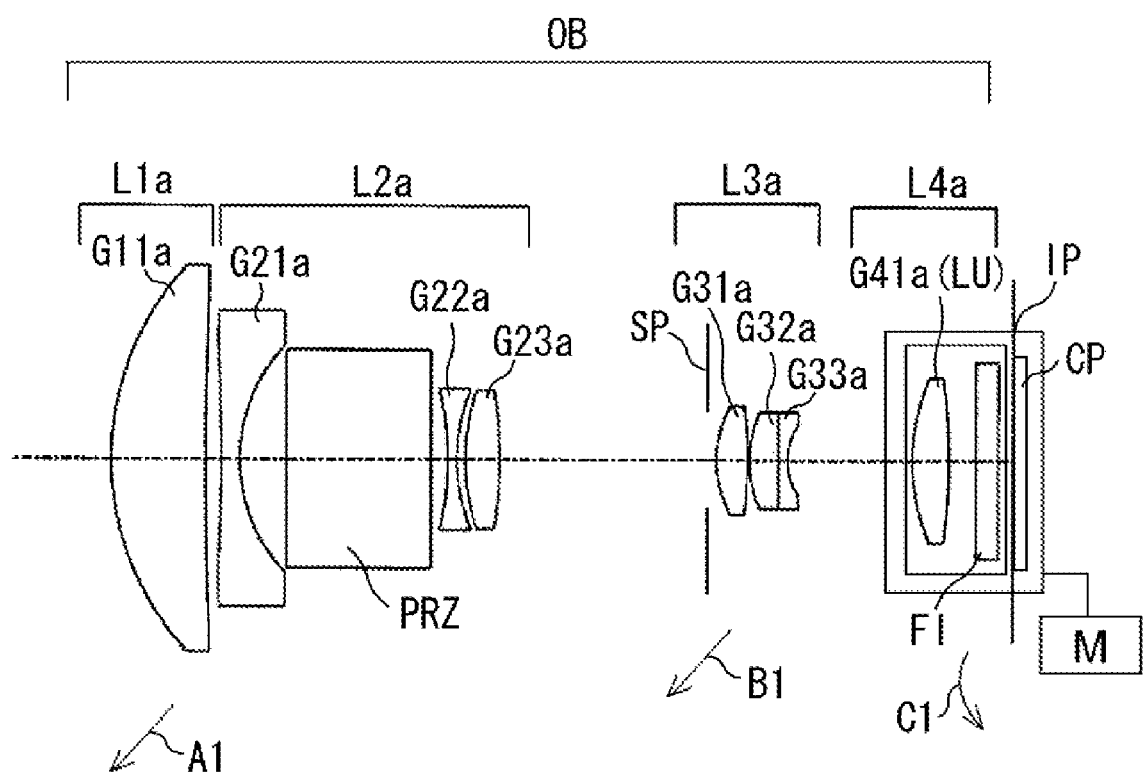
FIG. 1 is an optical cross-sectional view of a zoom lens according to a first exemplary embodiment of the present invention.

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example, the fabrication of the lens elements and their materials.

In all of the examples illustrated and discussed herein, any specific values, for example, the zoom ratio and F-number, should be interpreted to be illustrating only and non-limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Figure 2A:
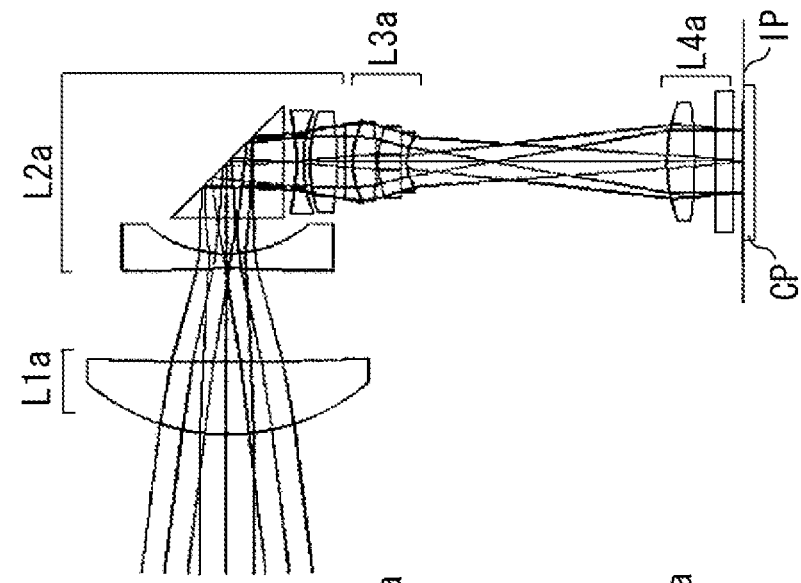
FIGS. 2A to 2C illustrate optical paths obtained by bending an optical path of the zoom lens 90° according to the first exemplary embodiment of the present invention.
Figure 2B:
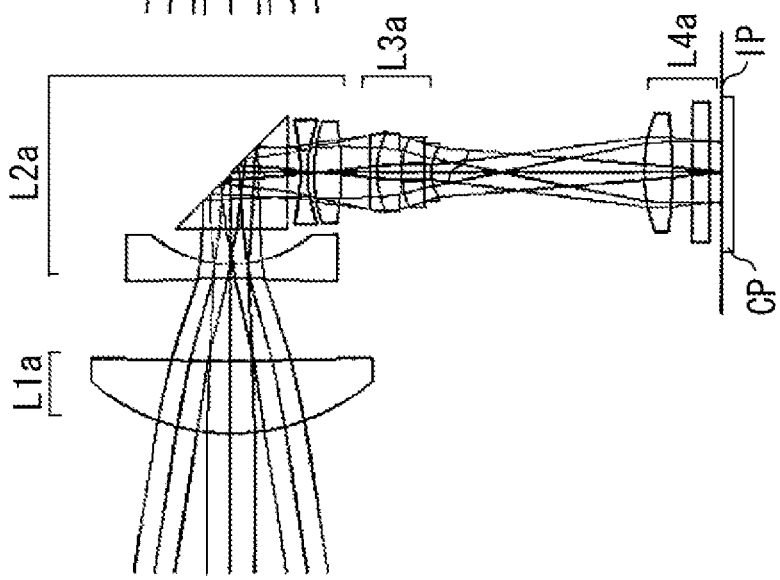
Figure 2C:
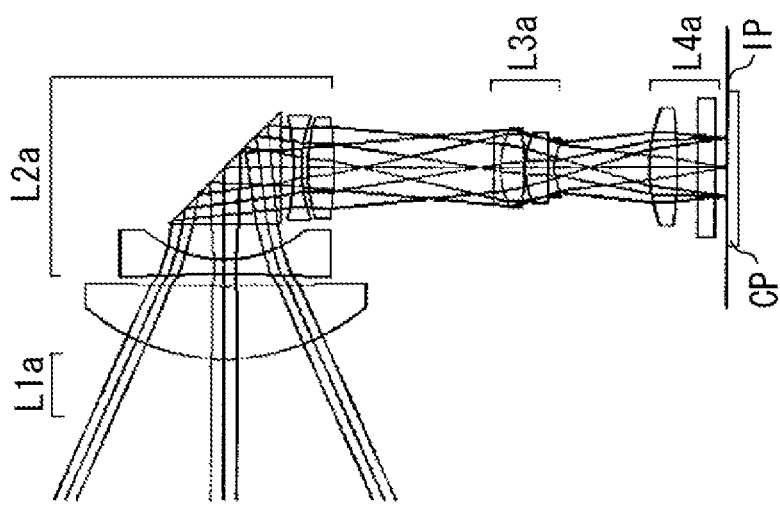

FIG. 1 is a lens cross-sectional view illustrating a zoom lens for use with an image pickup apparatus when an optical path thereof is expanded at a wide-angle end according to a first exemplary embodiment of the present invention. FIGS. 2A to 2C illustrate optical paths obtained by bending the optical path of the zoom lens with a reflecting member according to the first exemplary embodiment of the present invention.

Figure 3:
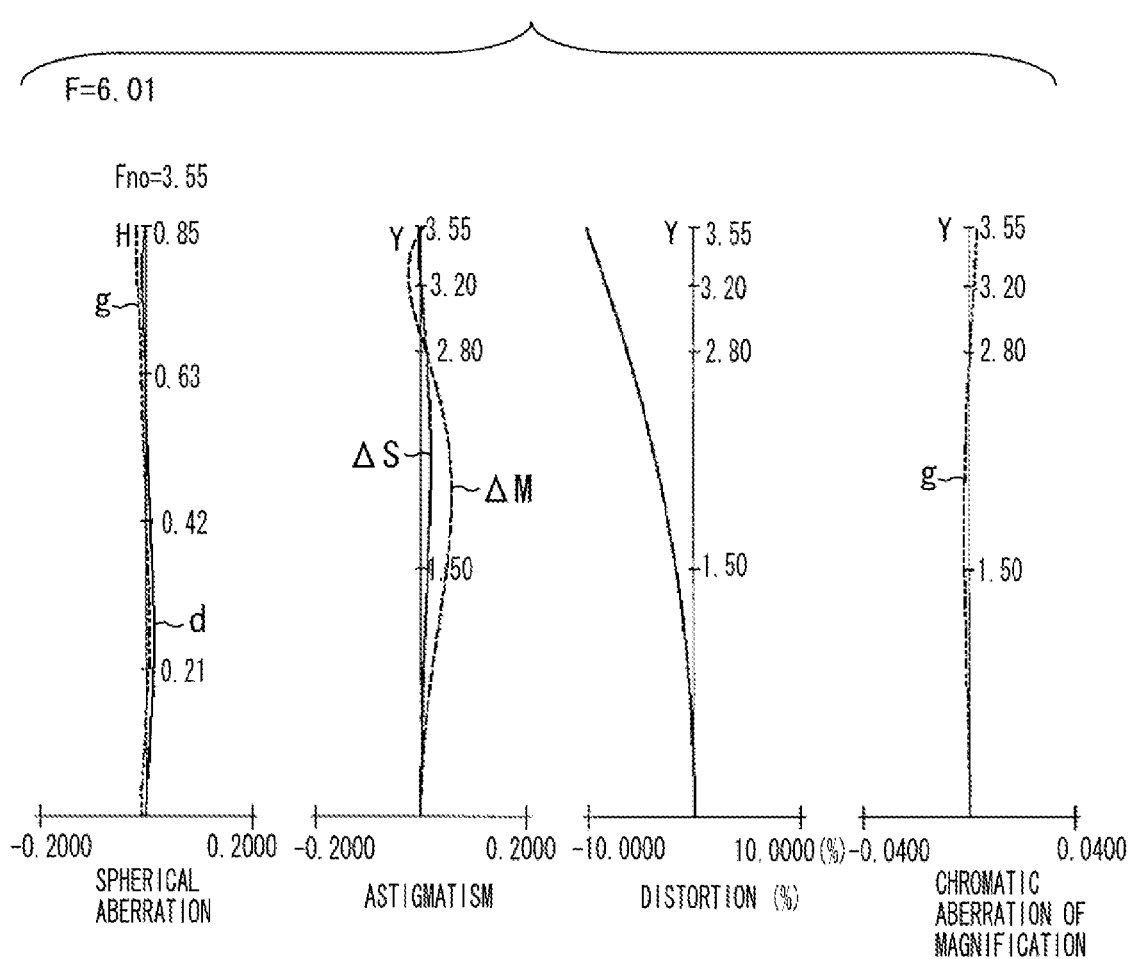
FIG. 3 illustrates aberration diagrams of the zoom lens at a wide-angle end according to the first exemplary embodiment of the present invention.
Figure 4:
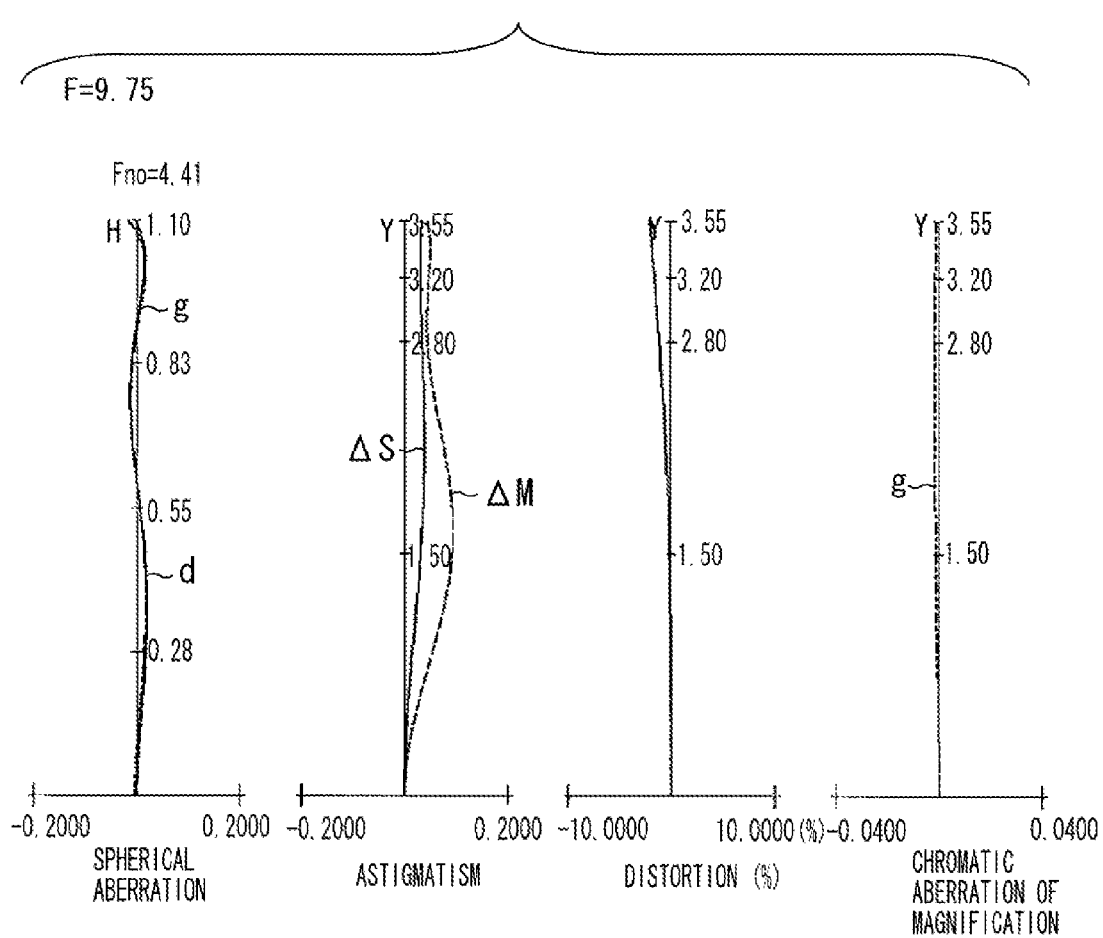
FIG. 4 illustrates aberration diagrams of the zoom lens at a middle zoom position according to the first exemplary embodiment of the present invention.
Figure 5:
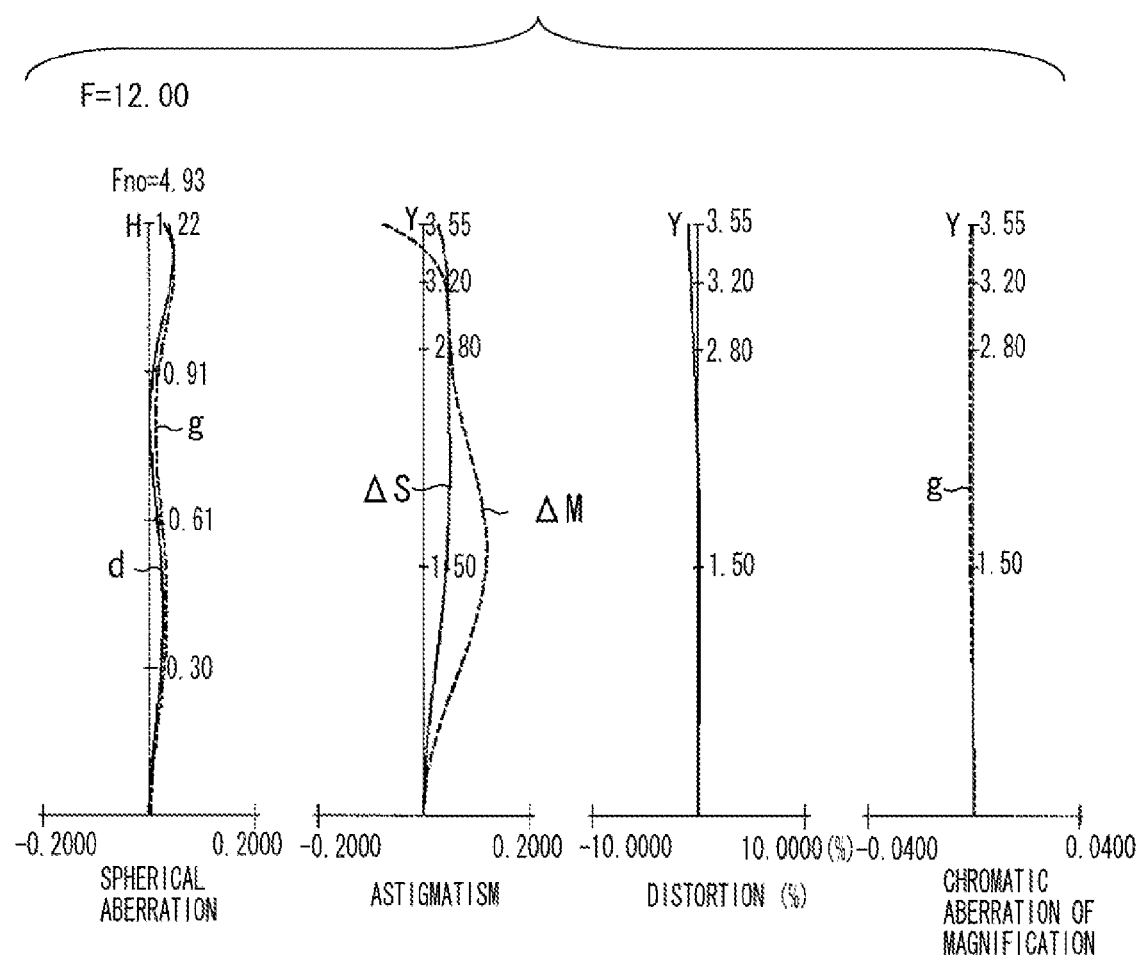
FIG. 5 illustrates aberration diagrams of the zoom lens at a telephoto end according to the first exemplary embodiment of the present invention.

FIGS. 3, 4, and 5 illustrate aberration diagrams at a wide-angle end (i.e., a short focal length end), a middle zoom position, and a telephoto end (i.e., a long focal length end) of the zoom lens according to the first exemplary embodiment of the present invention. In FIGS. 3 to 5, 8 to 10, and 13 to 15, the horizontal axis represents an amount of each aberration. The vertical axis H in the graph showing spherical aberration represents a pupil diameter (height of a light beam at the position of the pupil). The vertical axis in the graphs showing astigmatism, distortion, and chromatic aberration of magnification represents an image height.

Figure 6:
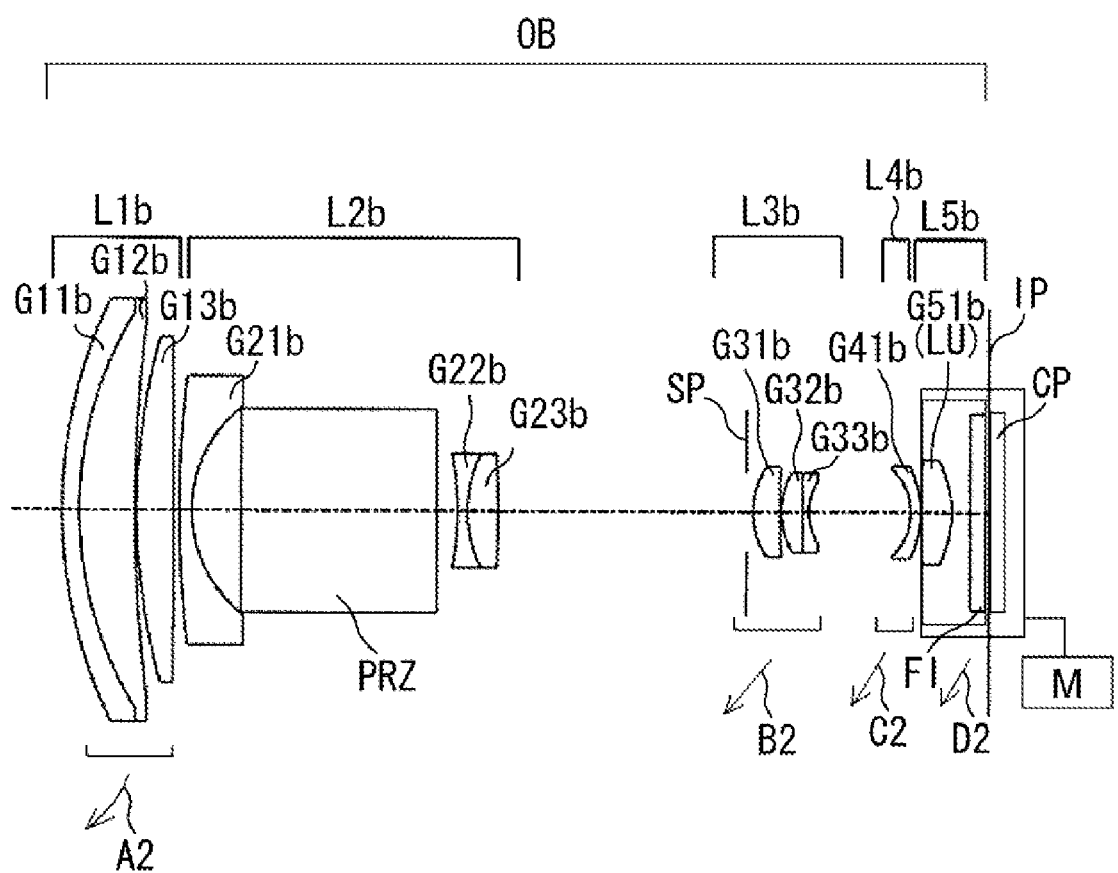
FIG. 6 is an optical cross-sectional view of a zoom lens according to a second exemplary embodiment of the present invention.
Figure 8:
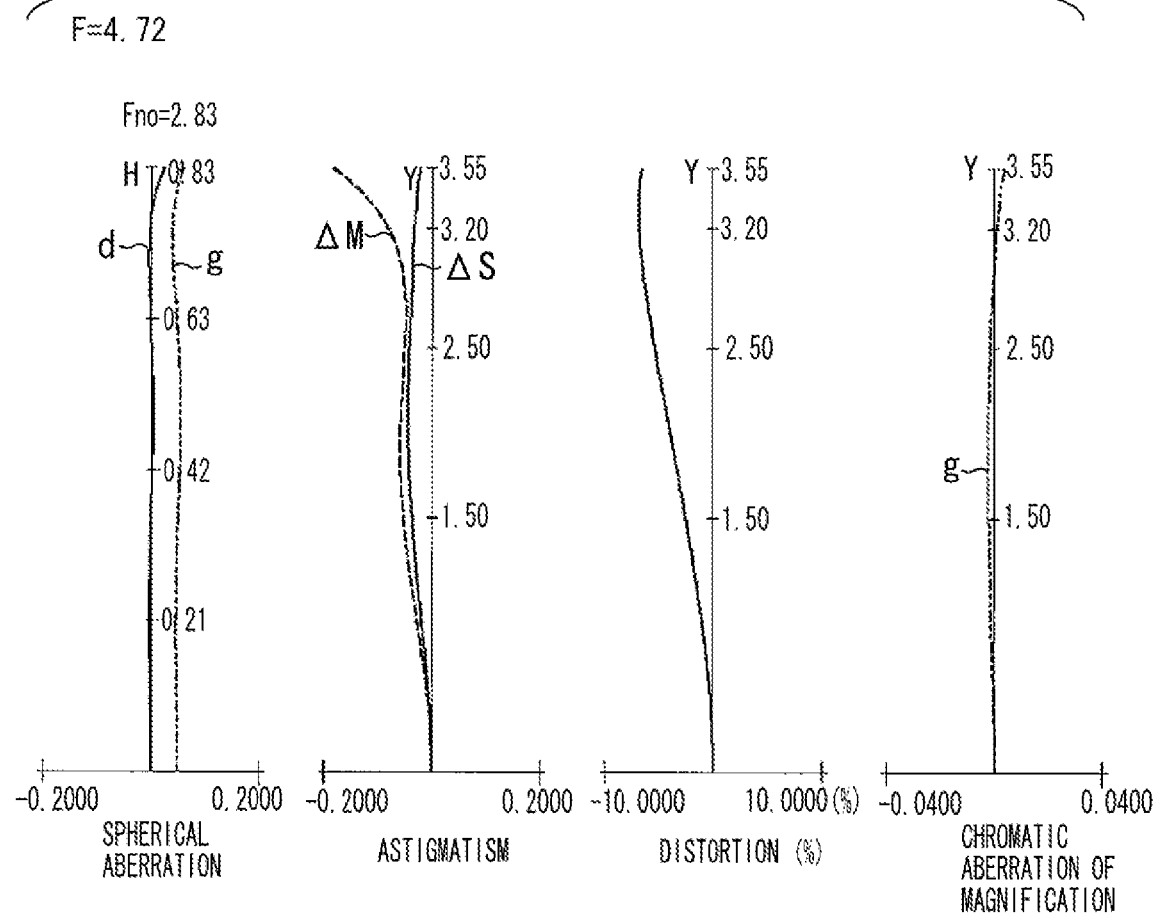
FIG. 8 illustrates aberration diagrams of the zoom lens at a wide-angle end according to the second exemplary embodiment of the present invention.
Figure 9:
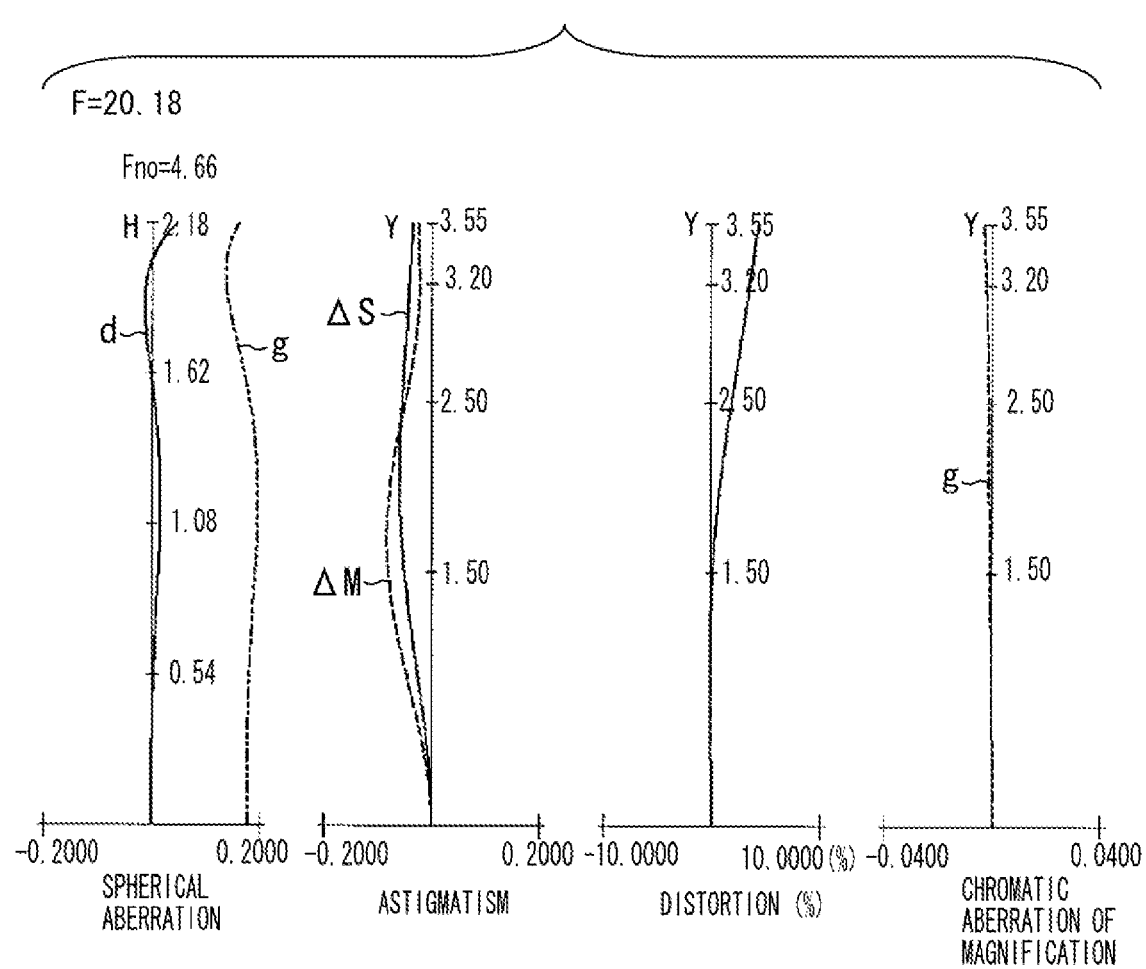
FIG. 9 illustrates aberration diagrams of the zoom lens at a middle zoom position according to the second exemplary embodiment of the present invention.
Figure 10:
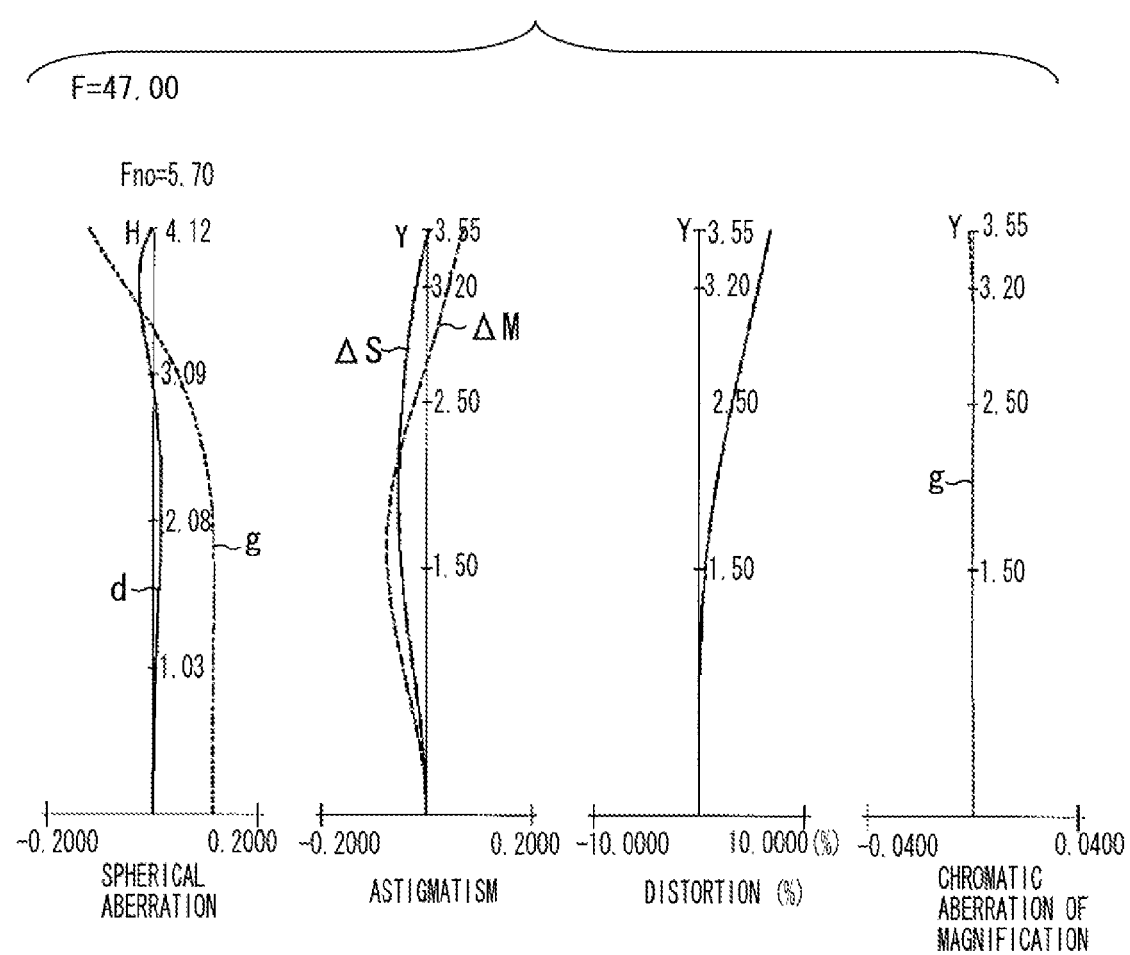
FIG. 10 illustrates aberration diagrams of the zoom lens at a telephoto end according to the second exemplary embodiment of the present invention.

FIG. 6 is a lens cross-sectional view illustrating a zoom lens for use with an image pickup apparatus when an optical path thereof is expanded at a wide-angle end according to a second exemplary embodiment of the present invention. FIGS. 7A to 7C illustrate optical paths obtained by bending the optical path of the zoom lens with a reflecting member according to the second exemplary embodiment of the present invention. FIGS. 8, 9, and 10 illustrate aberration diagrams at a wide-angle end (i.e., a short focal length end), a middle zoom position, and a telephoto end (i.e., a long focal length end) of the zoom lens according to the second exemplary embodiment of the present invention.

Figure 11:
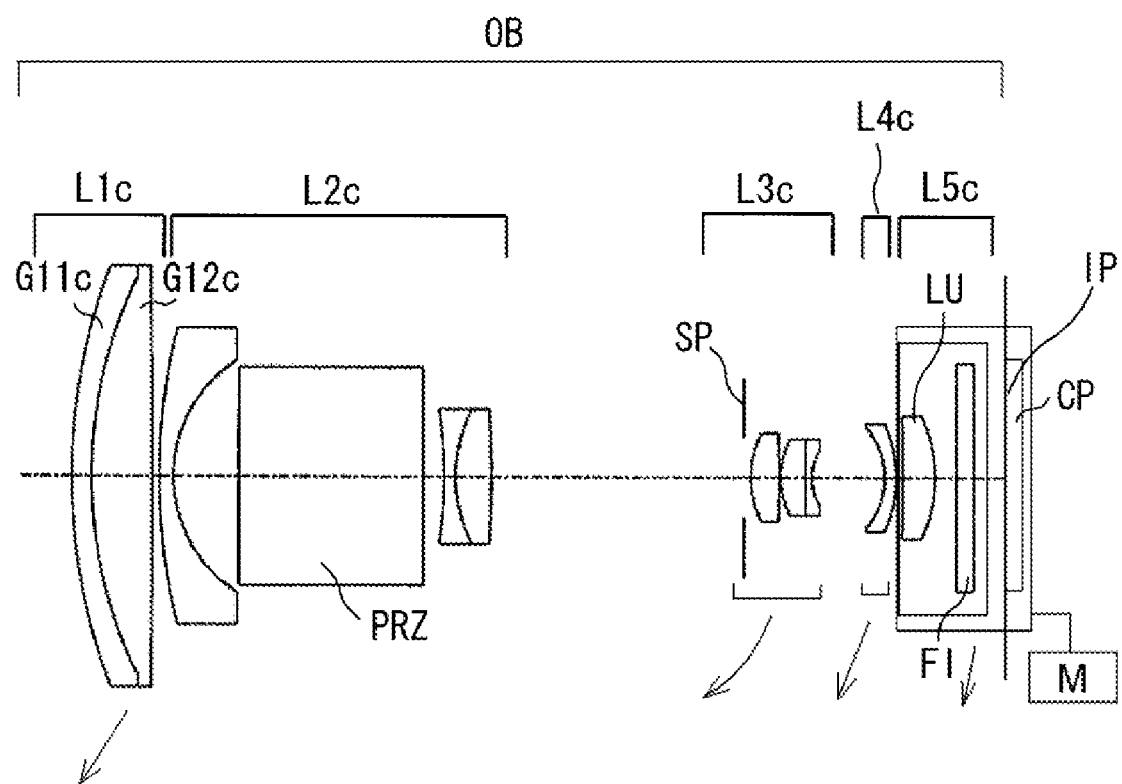
FIG. 11 is an optical cross-sectional view of a zoom lens according to a third exemplary embodiment of the present invention.
Figure 12A:
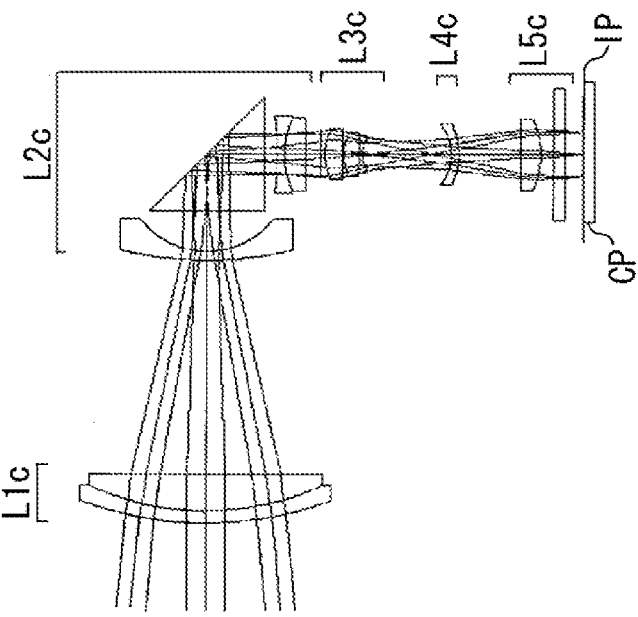
FIGS. 12A to 12C illustrate optical paths obtained by bending an optical path of the zoom lens 90° according to the third exemplary embodiment of the present invention.
Figure 12B:
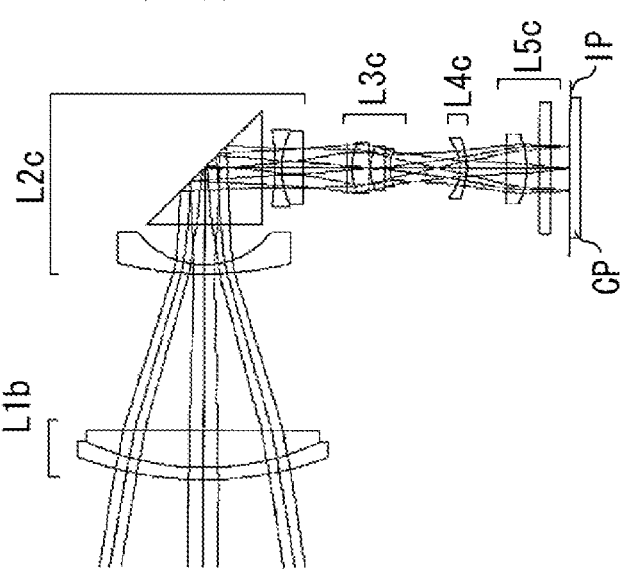
Figure 12C:
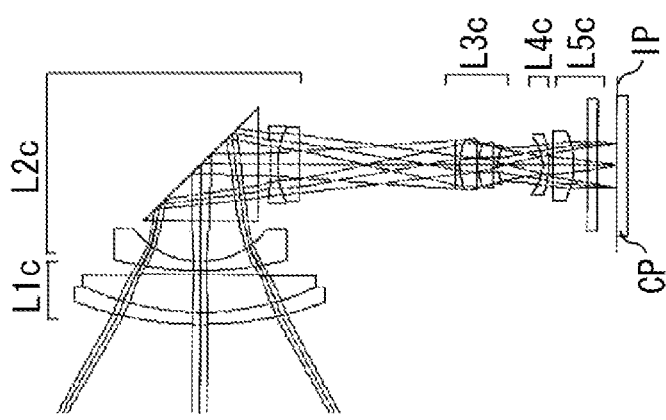
Figure 13:
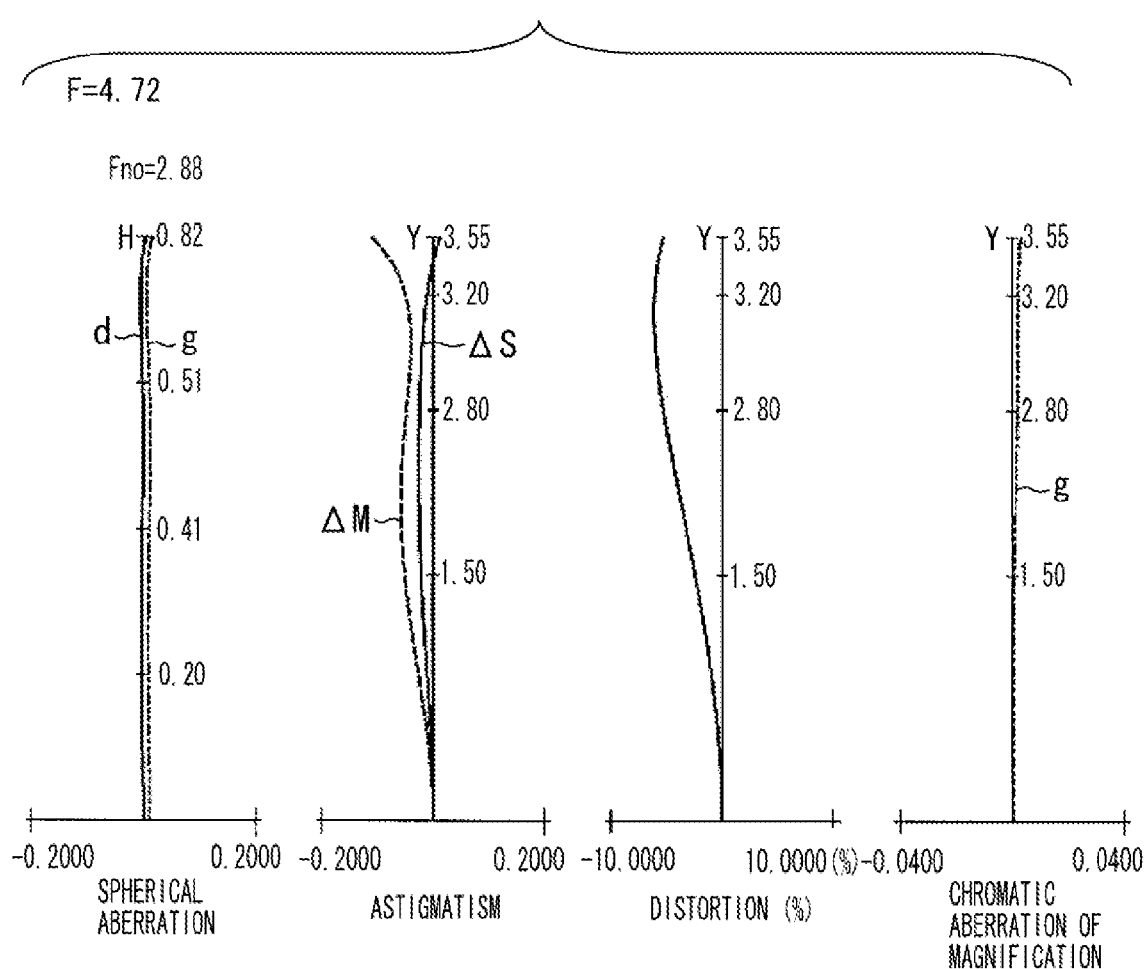
FIG. 13 illustrates aberration diagrams of the zoom lens at a wide-angle end according to the third exemplary embodiment of the present invention.
Figure 14:
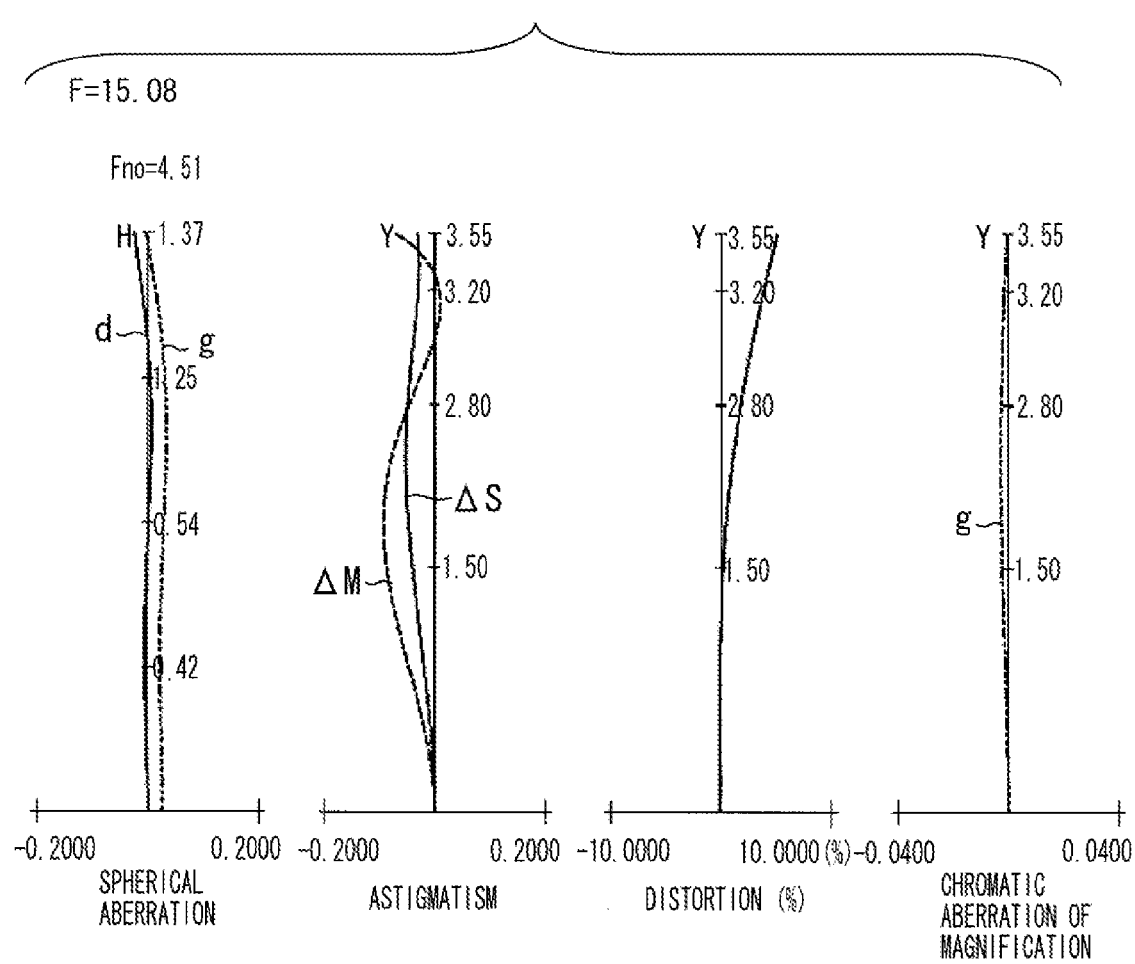
FIG. 14 illustrates aberration diagrams of the zoom lens at a middle zoom position according to the third exemplary embodiment of the present invention.
Figure 15:
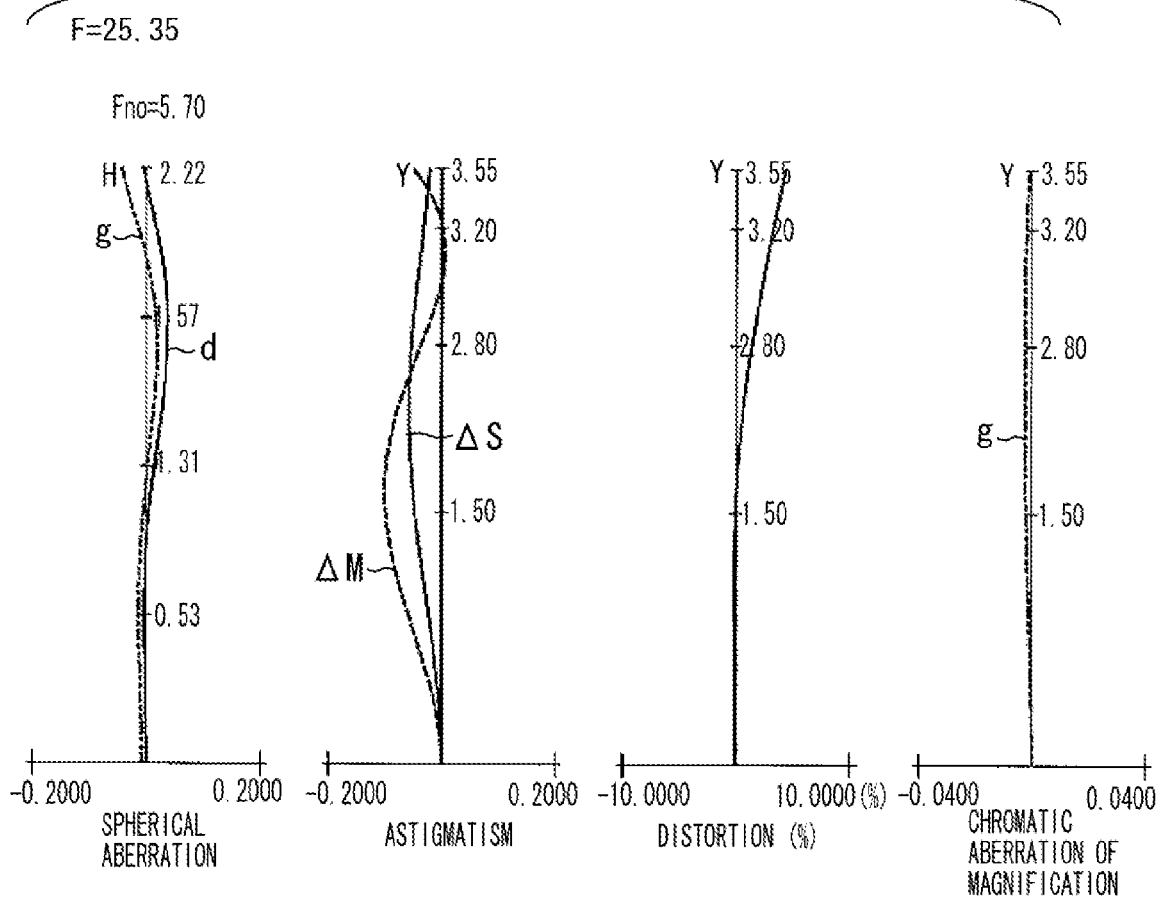
FIG. 15 illustrates aberration diagrams of the zoom lens at a telephoto end according to the third exemplary embodiment of the present invention.

FIG. 11 is a lens cross-sectional view illustrating a zoom lens for use with an image pickup apparatus when an optical path thereof is expanded at a wide-angle end according to a third exemplary embodiment of the present invention. FIGS. 12A to 12C illustrate optical paths obtained by bending the optical path of the zoom lens with a reflecting member according to the third exemplary embodiment of the present invention. FIGS. 13, 14, and 15 illustrate aberration diagrams at a wide-angle end (i.e., a short focal length end), a middle zoom position, and a telephoto end (i.e., a long focal length end) of the zoom lens according to the third exemplary embodiment of the present invention.

Additionally, FIGS. 2A, 7A, and 12A illustrate optical paths bent by the reflecting member at the wide-angle end of the zoom lens. FIGS. 2B, 7B, and 12B illustrate optical paths bent by the reflecting member at the middle zoom position of the zoom lens. FIGS. 2C, 7C, and 12C illustrate optical paths bent by the reflecting member at the telephoto end of the zoom lens.

Figure 16A:
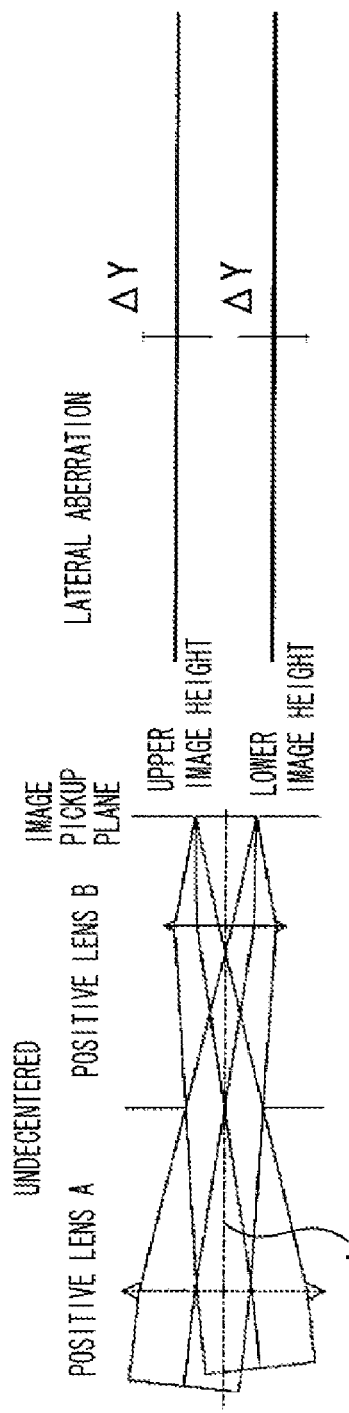
FIGS. 16A to 16C illustrate optical characteristics in cases where an image pickup element is tilted according to an exemplary embodiment of the present invention.
Figure 16B:
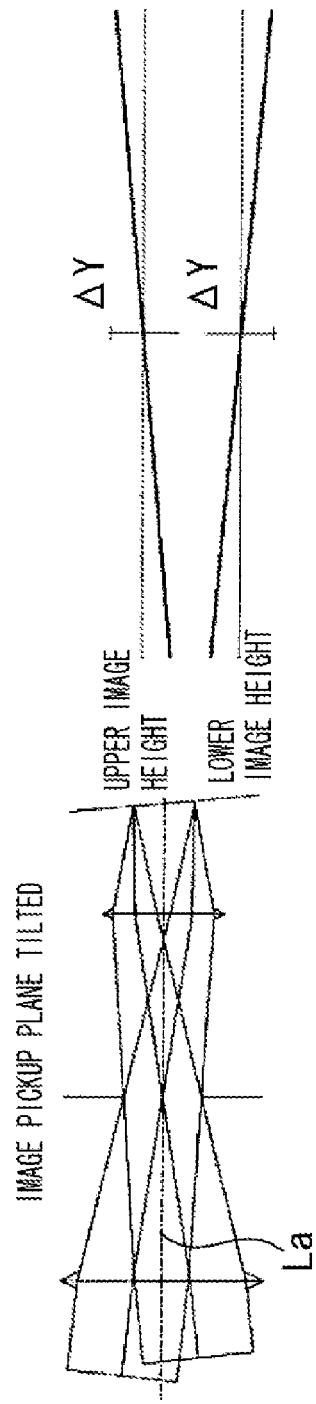
Figure 16C:
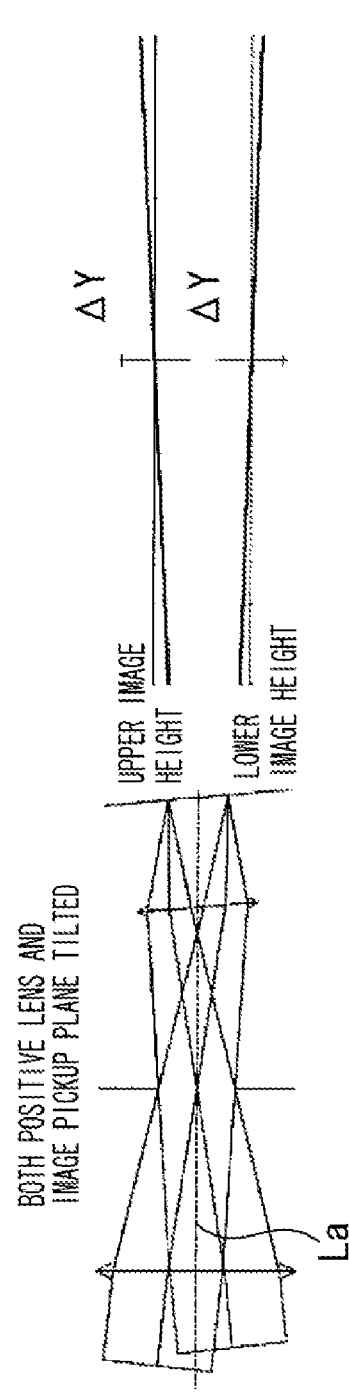

FIGS. 16A to 16C illustrate optical characteristics in a case where an image pickup element according to an exemplary embodiment of the present invention is tilted from a plane perpendicular to an optical axis.

Figure 17:
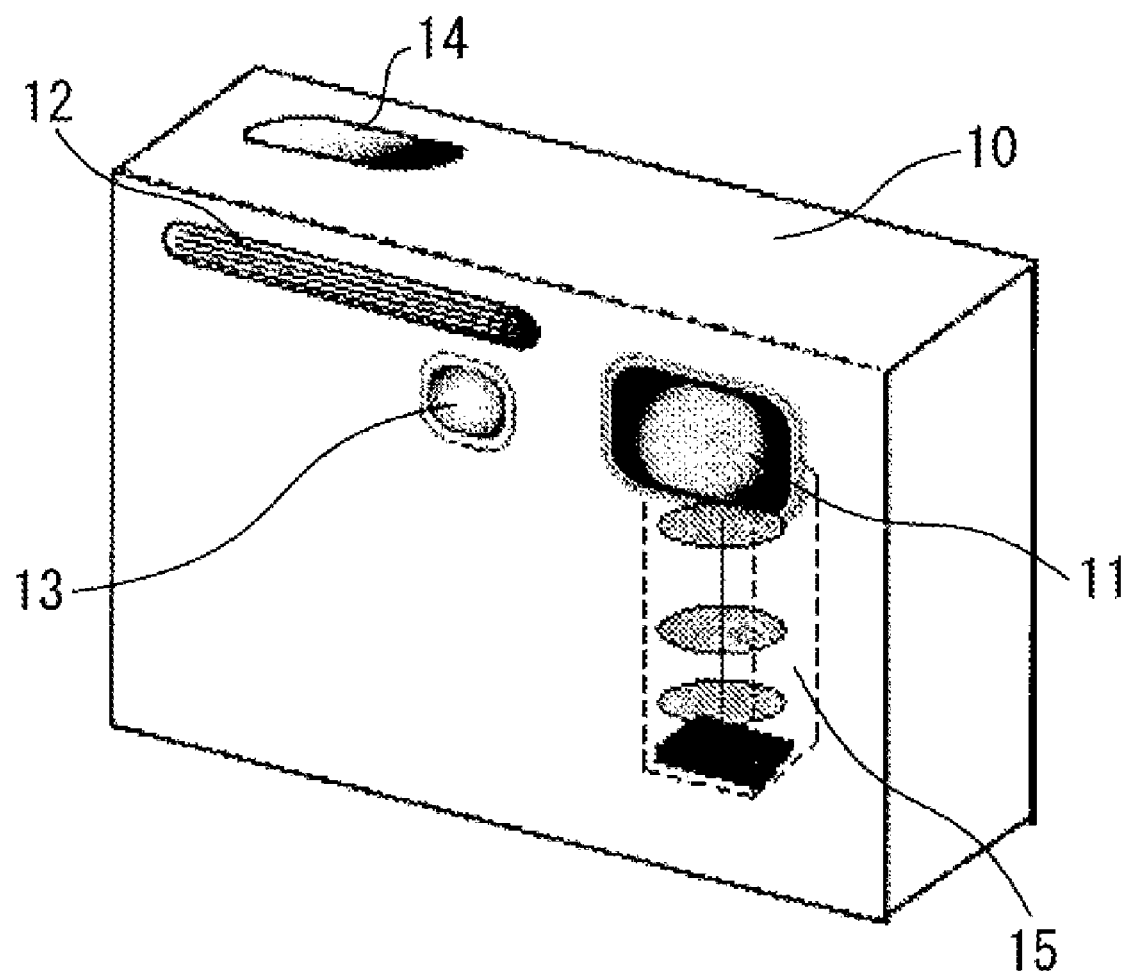
FIG. 17 is a perspective view of an image pickup apparatus according to an exemplary embodiment of the present invention.

FIG. 17 is a perspective view of a digital still camera (i.e., an image pickup apparatus) according to an exemplary embodiment of the present invention.

Figure 18:
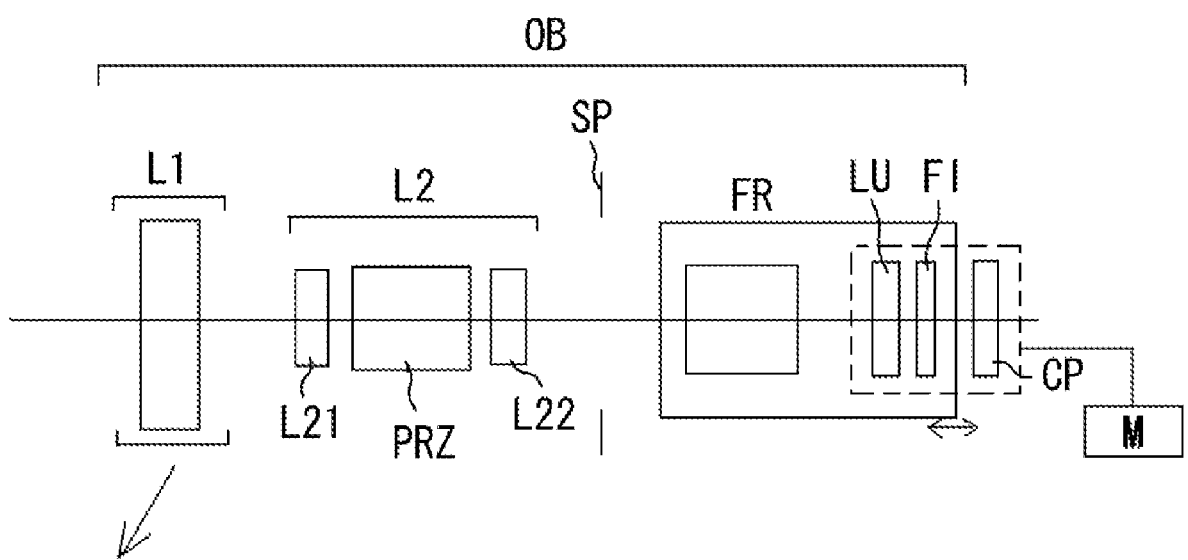
FIG. 18 illustrates a configuration of an optical system according to an exemplary embodiment of the present invention.

FIG. 18 illustrates a configuration of an optical system according to an exemplary embodiment of the present invention.

In each of the cross-sectional views of the zoom lenses according to the exemplary embodiments and the views illustrating the optical paths of the exemplary embodiments, the left-hand side corresponds to an object side (i.e., a front side), while the right-hand or lower side corresponds to an image side (i.e., a rear side).

In a case where the zoom lens of each of the exemplary embodiments is used with a projection apparatus, such as a projector, in each of the cross-sectional views of the zoom lenses according to the exemplary embodiments and the views illustrating the optical paths of the exemplary embodiments, the left-hand side corresponds to a screen, while the right-side or lower side corresponds to an image to be projected.

Next, an optical system OB illustrated in FIG. 18 is described below. The optical system OB serves as a zoom lens and can be housed in a lens barrel.

A first lens unit L1 has a positive refractive power (i.e., an optical power=an inverse of a focal length). A second lens unit L2 has a negative refractive power and is fixed to the lens barrel. The second lens unit L2 includes a lens member L21 having a negative refractive power, a reflecting member PRZ, such as a prism or a reflecting mirror, which deflects an optical axis by an angle ranging, for example, from 80° to 100°, and a lens member L22 having a negative refractive power. In the present embodiment, the optical axis between the first lens unit L1 (L1a) and the second lens unit L2 (L2a) is approximately parallel to a depth direction of the image pickup apparatus (that is, a direction from a photographic subject to the image pickup apparatus). The reflecting member PRZ refracts the optical axis between the first lens unit L1 (L1a) and the second lens unit L2 (L2a) to the vertical direction. Although the optical axis may be refracted to a horizontal direction, the vertical direction is more preferred. As a result, the optical axis between the second lens unit L2 (L2a) and the image sensor is approximately parallel to the vertical direction.

A rear lens unit FR includes at least one lens unit having a positive refractive power and totally has a positive refractive power. An image pickup element CP includes, for example, a solid-state image sensor (i.e., a photoelectric conversion element), such as a charge-coupled device (CCD) sensor or a complementary metal-oxide semiconductor (CMOS) sensor.

An aperture stop (i.e., an iris stop) SP is located between the second lens unit L2 and the rear lens unit FR. A lens member LU has a positive refractive power and constitutes a part of the rear lens unit FR that is closest to the image pickup element CP.

An optical block FI has no refractive power and corresponds to an optical filter, a face plate, a crystal low-pass filter, or an infrared cut filter.

An image plane IP corresponds to an image pickup plane of the image pickup element CP.

A moving mechanism M can move the image pickup element CP and the lens member LU integrally with each other during zooming. Thus, the lens member LU, the image pickup element CP, the filter FI, and the like are moved integrally with one another. Therefore, in the context of the present specification, the term "lens unit" can include an image pickup element.

In each of the aberration diagrams, curves d and g represent d-line and g-line light, respectively. Curves ΔM and ΔS correspond to a meridional image plane and a sagittal image plane, respectively. Chromatic aberration of magnification is represented with g-line light. "f" denotes a focal length. "Fno" denotes an F-number. The vertical axis in each of graphs showing spherical aberration represents an entrance pupil radius at a predetermined f-number Fno. The vertical axis in each of graphs showing astigmatism, distortion, and chromatic aberration of magnification represents an image height.

In the following description of each of the exemplary embodiments, the terms "wide-angle end" and "telephoto end" designate zoom positions respectively corresponding to both ends of a range in which a magnification varying lens unit can mechanically move along an optical axis.

According to each of the exemplary embodiments of the present invention, the first lens unit L1 moves during zooming. The second lens unit L2 is stationary for zooming. Although the second lens unit L2 can be moved for some adjustment, it is useful that the second lens unit L2 is always stationary. A lens unit or lens units included in the rear lens unit FR move such that an air interval between the second lens unit L2 and the rear lens unit FR varies. The moving mechanism M moves the lens member LU and the image pickup element CP integrally with each other along the optical axis such that the position of an image forming plane varying with the movement of the rear lens unit FR agrees with the position of the image pickup plane of the image pickup element CP.

In each of the exemplary embodiments of the present invention, the lens member LU having a positive refractive power and the image pickup element CP move integrally with each other such that the image pickup element CP is located at the position of the image plane, which varies with the variation of magnification.

The lens member LU, having a refractive power, which is closest to the image side, is located within a distance of 1.5×LD in terms of an air conversion length OD from the image pickup element CP. LD denotes a diagonal length of an effective image plane of the image pickup element CP.

The air conversion length OD is used to describe a length in the air. For example, in a case where a glass block is located in an optical path, the air conversion length OD of the glass block is expressed by the following equation:

$$OD = D/n$$

where "D" is a thickness in the direction of the optical axis of the glass block, and "n" is a refractive index of a material thereof.

In a case where the lens member LU having a positive refractive power is moved integrally with the image pickup element CP during zooming, occurrence of a one-sided blur can be decreased even when the image pickup element CP is tilted with respect to the optical axis.

Next, an optical action, which is caused when the image pickup element CP is tilted with respect to the optical axis in a case where the lens member LU and the image pickup element CP are moved integrally with each other, is described below with reference to FIGS. 16A to 16C.

FIGS. 16A to 16C illustrate a zoom position within a zoom range in a case where the optical system OB of the image pickup apparatus is expediently assumed to be constituted by a positive lens A and a positive lens B arranged in order from an object side to an image side.

FIG. 16A schematically illustrates the optical system in an undecentered state, in which the positive lens A and the positive lens B are not decentered with respect to an optical axis La.

More particularly, FIG. 16A illustrates optical paths of light beams focused into two points, which are arranged on an image pickup plane at an upper image height and a lower image height, using an ideal optical system in which the positive lens A and the positive lens B are fabricated so as to have designed values.

In the optical system illustrated in FIG. 16A, the positive lens B is assumed as a positive lens that is closest to the image side and that is very close to the image pickup element CP. The positive lens A is assumed as a positive lens having a composite refractive power of the remaining part of the optical system OB other than the positive lens B.

FIG. 16B illustrates a case where only the image pickup element CP is tilted with respect to the optical axis La. In the case illustrated in FIG. 16B, the point at the upper image height is in a front focus state, while the point at the lower image height is in a rear focus state. Because the light beams are obliquely incident on the image plane, the spot size of each of the light beams is large. Additionally, a lateral aberration at the point at the upper image height and that at the point at the lower image height are asymmetric with respect to the optical axis La.

FIG. 16C illustrates a case where the image pickup element CP and the positive lens B, which is closest to the image side, are integrally tilted with respect to the optical axis La.

When the light beams to be incident on the two points respectively located at the upper image height and the lower image height are incident on the positive lens B, angles of incidence of light beams being incident onto the positive lens B change in the following manner, as compared with those of incidence of light beams being incident onto the positive lens B in the undecentered state illustrated in FIG. 16A. That is, an angle of incidence of a light beam (hereunder referred to as an upper light beam) being incident onto the point at the upper image height in the state illustrated in FIG. 16C becomes smaller than that of incidence of an upper light beam in the undecentered state. An angle of incidence of a light beam (hereunder referred to as a lower light beam) being incident onto the point at the lower image height in the state illustrated in FIG. 16C becomes larger than that of incidence of a lower light beam in the undecentered state.

Thus, among the light beams passing through the positive lens B, the upper light beam is strongly refracted towards the optical axis, because a positive refraction effect is enhanced. Conversely, the opposite effect is caused by the lower light beam.

Consequently, a change in the refraction effect of the upper and lower light beams occurs according to a direction of tilting the image pickup plane. Thus, in the case illustrated in FIG. 16C, an effect of suppressing an image change caused in the case illustrated in FIG. 16B, in which only the image pickup plane is tilted, is produced. Accordingly, an amount of lateral aberration occurring in the case illustrated in FIG. 16C is smaller than that of lateral aberration occurring in the case illustrated in FIG. 16B.

An order of arranging the refractive lenses in the optical system OB from the object side to the image side is not limited to the order in which the positive lens A and the positive lens B are arranged from the object side to the image side. A negative lens and a positive lens can be arranged in the optical system OB in this order from the object side to the image side.

To maintain the optical performance well when the image pickup element is moved along the optical axis, the image pickup element should be moved such that the image pickup plane of the image pickup element is kept perpendicular to the optical axis.

In a case where the image pickup plane is tilted with respect to the optical axis when the image pickup element is moved, a problem of focus nonuniformity (i.e., a one-sided blur state) occurs in marginal images opposed as viewed from the center of an image plane. This results in image degradation.

However, according to the first to third exemplary embodiments of the present invention, when the image pickup element CP is moved, the image pickup element CP and the lens member LU having a positive refractive power are moved integrally with each other. Accordingly, even when the image pickup plane of the image pickup element CP is tilted, non-uniformity of optical performance of the entire image plane is small. Consequently, high-quality images can be maintained.

In such a case, it is useful that the lens member LU having a refractive power is made to be close to the image pickup element CP. The lens member LU having a refractive power, which is closest to the image pickup element, should be disposed within a distance of 1.5×LD in terms of an air conversion length from the image pickup element CP. Additionally, it is useful that a distance between the image pickup element CP and a lens member having a refractive power, which is closest to the image pickup element CP, is equal to or less than 1×LD in terms of an air conversion length. It is more useful that this distance is equal to or less than 0.7×LD in terms of an air conversion length.

In the first to third exemplary embodiments, a diagonal length LD of an effective image plane of the image pickup element CP is 7.1 mm. An air conversion length of a distance (i.e., an air conversion length of a back focus) between a refractive lens (i.e., a lens having a refractive power), which is closest to the image pickup element CP, and the image pickup element CP in each of the first to third exemplary embodiments is as follows:

| First exemplary embodiment  | 3.1 mm |
| Second exemplary embodiment | 2.6 mm |
| Third exemplary embodiment  | 4.5 mm |

In the optical system illustrated in FIG. 18, a focal length PFL of the lens member LU having a positive refractive power and a focal length Fw of the zoom lens when focusing on an infinitely distant object at a wide-angle end satisfy the following condition:

$$0.25 < Fw/PFL < 0.55 \qquad (3).$$

In a case where the ratio (Fw/PFL) exceeds an upper limit value of the condition (3), the refractive power of the lens member LU having a positive refractive power is too strong. Thus, an exit pupil diameter tends to increase. This is undesirable because the outside diameter of the lens member LU having a positive refractive power should be increased to obtain a given amount of marginal light and, additionally, large off-axis aberration is generated.

On the other hand, in a case where the ratio (Fw/PFL) exceeds a lower limit value of the condition (3), the refractive power of the lens member LU having a positive refractive power is too weak. This is undesirable because an effect of correcting an image degradation due to a one-sided blur is weakened.

A composite focal length FFw of the first lens unit L1 and the second lens unit L2 at the wide-angle end and a focal length FRw of the rear lens unit FR at the wide-angle end satisfy the following conditions (1) and (2):

$$0.3 < |Fw/FFw| < 0.6 \ (FFw<0) \qquad (1)$$

$$0.2 < Fw/FRw < 0.6 \qquad (2).$$

The condition (1) relates to the ratio of a focal length of the zoom lens at the wide-angle end to a composite focal length of the first lens unit L1 and the second lens unit L2 having a reflecting member PRZ. The condition (1) is set to obtain good image quality while reducing the outside diameter of the zoom lens.

In a case where the absolute value of the ratio (|Fw/FFw|) exceeds an upper limit value of the condition (1), a composite negative refractive power of the first lens unit L1 and the second lens unit L2 becomes stronger. Thus, large positive spherical aberration occurs. It is difficult to correct such positive spherical aberration.

On the other hand, in a case where the absolute value of the ratio (|Fw/FFw|) exceeds a lower limit value of the condition (1), a retro-focus effect of the entire zoom lens is weakened. Thus, a back focus is too short. Filters, such as a low-pass filter and an infrared cut filter, to be inserted into a space between the image pickup plane and the lens member LU cannot be located therein.

Additionally, large off-axis aberration occurs according to an increase of the lens diameter of the second lens unit L2. This is undesirable.

The condition (2) relates to the ratio of a focal length of the zoom lens at the wide-angle end to the focal length of the rear lens unit FR at the wide-angle end.

In a case where the ratio (Fw/FRw) exceeds an upper limit value of the condition (2), a positive refraction effect of the rear lens unit FR is too large. Large high-order spherical aberration and coma occur. It is difficult to correct such aberrations.

On the other hand, in a case where the ratio (Fw/FRw) exceeds a lower limit value of the condition (2), an amount of movement of each lens unit is increased to assure a given zoom range. Thus, the total length of the zoom lens is increased. This is undesirable.

Furthermore, it is useful to set numerical value ranges of the conditions (1) to (3) as follows:

$$0.35 < |Fw/FFw| < 0.5 \ (FFw < 0) \tag{1a}$$

$$0.25 < Fw/FRw < 0.5 \tag{2a}$$

$$0.3 < Fw/PFL < 0.5 \tag{3a}$$

It is more useful that the lower limit value of the condition (1a) is set at 0.4, that the upper limit value of the condition (1a) is set at 0.47, that the lower limit value of the condition (2a) is set at 0.27, that the upper limit value of the condition (2a) is set at 0.43, the lower limit value of the condition (3a) is set at 0.35, and that the upper limit value of the condition (3a) is set at 0.48.

In each of the exemplary embodiments, it is useful that an operation of focusing the zoom lens on a finite distance object is performed by moving the image pickup element CP or a set of the image pickup element CP and the lens member LU along the optical axis.

Alternatively, an operation of focusing the zoom lens on a finite distance object can be performed by moving a lens unit other than the second lens unit L2 having the reflecting member PRZ along the optical axis. Alternatively, an operation of focusing the zoom lens on a finite distance object can be performed by using a floating method.

In each of the exemplary embodiments, the variation of movement of the image plane caused by zooming is compensated for by moving the image pickup element CP along the optical axis.

The reflecting member PRZ is located within the second lens unit L2 having a negative refractive power, which is located closer to the object side than the position of a shutter or the iris stop SP. Additionally, a negative lens member L21 is located at the object side of the reflecting member PRZ.

A lens unit located at the position of a pupil or an iris stop has an optical path in which an off-axis light beam intersects with the optical axis at the position of the pupil. Thus, this produces a refraction effect such that an off-axis light beam having passed through a negative lens located at the object side of the reflecting member PRZ becomes approximately parallel to the optical axis.

Additionally, a space, into which the reflecting member PRZ is inserted, is provided at the image side of the negative lens. Thus, a change in optical characteristics can be prevented from occurring due to a change in the position of the pupil. Also, a necessary space, into which the reflecting member PRZ is inserted, can be reduced in size.

The second lens unit L2 having a negative refractive power and including the reflecting member PRZ is set to have a strongest negative refractive power among the lens units of the zoom lens.

A reason for this is that if a lens unit having a strongest negative power is moved, the variation of movement of the image plane can be compensated for by moving the lens unit only by a small amount. This is effective in miniaturizing the optical system.

In each of the exemplary embodiments, the second lens unit L2 is stationary on the optical axis. Thus, an amount of variation of movement of the image plane caused by zooming is equivalent to an amount of a relative change in position between the lens unit for compensating for the position of the image plane and the image pickup element CP. Accordingly, an amount of movement of the image pickup element CP for compensating for the position of the image plane can be reduced.

Thus, in each of the exemplary embodiments, the reflecting member PRZ is located within the second lens unit L2 having a negative refractive power as the lens unit that meets the above-described conditions.

It is effective for achieving high image quality to configure each exemplary embodiment as follows. That is, a lens having at least one aspherical surface is introduced into the rear lens unit FR, which is located at the image side of the second lens unit L2 including the reflecting member PRZ. This is effective in implementing a compact high-performance optical system while reducing the number of lenses. This facilitates correcting spherical aberration occurring in the second lens unit L2.

The aspherical lens can be implemented using a composite aspherical surface (i.e., a replica aspherical surface) so as to increase the number of types of glass that can be used in consideration of productivity. Further, the aspherical lens can be made of a plastic material.

Additionally, a diffractive optical element or an optical element made of a gradient index optical material can be introduced into the rear lens unit FR. This facilitates enhancing the optical performance of the zoom lens.

A change in position of an entrance pupil can be decreased by moving, during zooming, the iris stop SP along the optical axis independent of the lens units. For simplification of the mechanism, the iris stop SP can be fixed onto the optical axis during zooming.

A lens unit or a part of the lens unit can be decentered to correct an image blur caused by a camera shake, which causes image quality degradation during photographing. An angle at or a direction in which the optical axis is deflected by the reflecting member PRZ can be changed by rotating or moving the reflecting member PRZ. Thus, an effect of changing the position of an image can be generated to cancel an image blur occurring during photographing.

A mechanism for moving the image pickup element CP in a direction perpendicular to the direction of the optical axis can be used to correct an image blur due to a camera shake.

Although a prism is used in each of the exemplary embodiments as the reflecting member PRZ, a reflecting mirror can be used instead of the prism.

As described above, according to an exemplary embodiment, an appropriate zoom lens is used as the optical system with a lens unit which is moved during zooming. Consequently, a high variable-magnification and high-image-quality compact zoom lens having a wide field angle, which is suitable for reducing the size of an image pickup apparatus, can be obtained.

Next, first to third exemplary embodiments are described below.

First Exemplary Embodiment

An optical system OB illustrated in FIG. 1 according to a first exemplary embodiment is a four-unit zoom lens that includes, in order from an object side to an image side, a first lens unit L1a having a positive refractive power, a second lens unit L2a having a negative refractive power, a third lens unit L3a having a positive refractive power, and a fourth lens unit L4a having a positive refractive power.

The fourth lens unit L4a includes a lens member LU having a positive refractive power located within a distance of 1.5× LD in terms of an air conversion length from an image pickup element CP. LD denotes a diagonal length of an effective image plane of the image pickup element CP.

The second lens unit L2a includes a reflecting member PRZ that deflects an optical axis by an angle ranging from 80° to 100°.

The second lens unit L2a is stationary during zooming from a wide-angle end to a telephoto end. During zooming, the first lens unit L1a is moved to the object side, as indicated by arrow A1 illustrated in FIG. 1. The third lens unit L3a is moved to the object side, as indicated by arrow B1 illustrated in FIG. 1, such that an air interval between the second lens unit L2a and the third lens unit L3a is narrowed. The fourth lens unit L4a is moved along the optical axis, as indicated by arrow C1 illustrated in FIG. 1, to correct various aberrations. The fourth lens unit L4a and the image pickup element CP are moved integrally with each other by a moving mechanism M in the direction of the optical axis to make the position of an image plane, which varies with the movement of the fourth lens unit L4a, to agree with the position of an image pickup plane of the image pickup element CP.

With this zoom configuration, a magnification varying effect is generated by moving the first lens unit G11a having a positive refractive power and the third lens unit L3a having a positive refractive power, which adjoin the second lens unit L2a having a negative refractive power.

In the first exemplary embodiment illustrated in FIG. 1, the first lens unit L1a includes a positive lens G11a. The second lens unit L2a includes, in order from the object side to the image side, a negative lens G21a both of lens surfaces of which are concave surfaces, a reflecting member PRZ, a negative lens G22a, and a positive lens G23a.

The third lens unit L3a includes, in order from the object side to the image side, a biconvex positive lens G31a, a positive lens G32a, and a negative lens G33a.

The fourth lens unit L4a includes, in order from the object side to the image side, a positive lens G41a (LU) and a parallel plate (optical block) F1.

Additionally, Table 1 describes a relationship among the lens units L1a to L4a, the rear lens unit FR, and the lens member LU.

The above-described conditions (1) to (3) in the first exemplary embodiment are as follows.

A focal length PFL of the lens member LU and a focal length Fw of the zoom lens at the wide-angle end satisfy the condition (3) as follows:

$$0.25 < Fw/PFL < 0.55 \quad (3).$$

A composite focal length FFw of the first lens unit L1a and the second lens unit L2a at the wide-angle end and a composite focal length FRw of the third lens unit L3a and the fourth lens unit L4a at the wide-angle end satisfy the conditions (1) and (2) as follows:

$$0.3 < |Fw/FFw| < 0.6 \ (FFw<0) \quad (1)$$

$$0.2 < Fw/FRw < 0.6 \quad (2).$$

In the first exemplary embodiment, a positive lens of the third lens unit L3a or the fourth lens unit L4a can be moved such that the position of the positive lens has a component in a direction perpendicular to the optical axis. Thus, an effect of displacing an image plane is generated. Consequently, an image blur due to a camera shake can be corrected.

Second Exemplary Embodiment

An optical system OB illustrated in FIG. 6 according to a second exemplary embodiment is a five-unit zoom lens that includes, in order from the object side to the image side, a first lens unit L1b having a positive refractive power, a second lens unit L2b having a negative refractive power, a third lens unit L3b having a positive refractive power, a fourth lens unit L4b having a negative refractive power, and a fifth lens unit L5b having a positive refractive power.

The fifth lens unit L5b includes a lens member LU having a positive refractive power located within a distance of 1.5× LD in terms of an air conversion length from an image pickup element CP. LD denotes a diagonal length of an effective image plane of the image pickup element CP.

The second lens unit L2b includes a reflecting member PRZ that deflects an optical axis by an angle ranging from 80° to 100°.

During zooming from the wide-angle end to the telephoto end, the first lens unit L1b is moved to the object side, as indicated by arrow A2 illustrated in FIG. 6. The second lens unit L2b is stationary. The third lens unit L3b is moved to the object side, as indicated by arrow B2 illustrated in FIG. 6, such that an air interval between the second lens unit L2b and the third lens unit L3b is narrowed. The fourth lens unit L4a is moved along the optical axis, as indicated by arrow C2 illustrated in FIG. 6, to correct various aberrations. The fifth lens unit L5b and the image pickup element CP are moved integrally with each other by a moving mechanism M, as indicated by arrow D2 illustrated in FIG. 6, to make the position of an image plane, which varies with the movement of the fourth lens unit L4a, to agree with the position of an image pickup plane of the image pickup element CP.

The second exemplary embodiment of the present invention can correct variation in curvature of field during varying a magnification, which become problematic with increasing the variable magnification. Consequently, the second exemplary embodiment of the present invention can obtain high optical performance over the entire variable magnification range.

In the second exemplary embodiment illustrated in FIG. 6, the first lens unit L1b includes, in order from the object side to the image side, a meniscus negative lens G11b whose object-side surface is convex, a positive lens G12b, and a positive lens G13b.

Distortion and chromatic aberration of magnification at the wide-angle end are corrected by the negative lens G11b and the positive lenses G12b and G13b.

The second lens unit L2b includes, in order from the object side to the image side, a meniscus negative lens G21b whose object-side surface is convex, a reflecting member PRZ, a negative lens G22b, and a positive lens G23b.

The third lens unit L3b includes, in order from the object side to the image side, an aperture stop SP, a biconvex positive lens G31b, a positive lens G32b, and a negative lens G33b.

The fourth lens unit L4b includes a negative lens G41b whose object-side surface is concave.

The fifth lens unit L5b includes, in order from the object side to the image side, a positive lens G51b (LU), and a parallel plate (optical block) F1.

Additionally, Table 1 describes a relationship among the lens units L1b to L5b, the rear lens unit FR, and the lens member LU.

The above-described conditions (1) to (3) in the second exemplary embodiment are as follows.

A focal length PFL of the lens member LU and a focal length Fw of the zoom lens at the wide-angle end satisfy the condition (3) as follows:

$$0.25 < Fw/PFL < 0.55 \quad (3).$$

A composite focal length FFw of the first lens unit L1b and the second lens unit L2b at the wide-angle end and a composite focal length FRw of the third lens unit L3b, the fourth lens unit L4b, and the fifth lens unit L5b at the wide-angle end satisfy the conditions (1) and (2) as follows:

$$0.3 < |Fw/FFw| < 0.6 \ (FFw < 0) \quad (1)$$

$$0.2 < Fw/FRw < 0.6 \quad (2).$$

In the optical system OB according to the second exemplary embodiment, a positive lens of the third lens unit L3b or the fifth lens unit L5b can be moved such that the position of the positive lens has a component in a direction perpendicular to the optical axis. Thus, an effect of displacing an image plane is generated. Consequently, an image blur due to a camera shake can be corrected.

Third Exemplary Embodiment

An optical system OB illustrated in FIG. 11 according to a third exemplary embodiment is a 5-unit zoom lens, similarly to the second exemplary embodiment.

A configuration of lenses of the optical system OB of the third exemplary embodiment is similar to that of lenses of the optical system OB of the second exemplary embodiment except a configuration of lenses of a first lens unit L1c.

In the third exemplary embodiment, the first lens unit L1c includes, in order from the object side to the image side, a meniscus negative lens G11c whose object-side surface is convex, and a positive lens G12c.

The configuration of the other lens units L2c, L3c, L4c, and L5c of the third exemplary embodiment is similar to that of the corresponding lens units of the second exemplary embodiment. Consequently, the third exemplary embodiment can obtain advantages similar to those of the second exemplary embodiment.

As described above, according to an exemplary embodiment, an image pickup apparatus including a compact optical system having a zoom ratio of about 4 to about 10 and including a wide field angle can be obtained, which is suitable for use in a compact digital camera or a video camera lens system using an image pickup element.

TABLE 1

| Exemplary Embodiment | Rear Lens Unit FR | Lens Member LU |
|---|---|---|
| First Exemplary Embodiment | 4-unit zoom lens | L4 |
| Second Exemplary Embodiment | 5-unit zoom lens | L3, L4, L5 | L5 |
| Third Exemplary Embodiment | 5-unit zoom lens | L3, L4, L5 | L5 |

Next, numerical examples 1 to 3 respectively corresponding to the first to third exemplary embodiments are described below. In the following description of the numerical examples 1 to 3, "i" designates the ordinal number of each optical surface from the object side. "Ri" denotes a radius of curvature of the i-th surface, "Di" designates an interval between the i-th surface and the (i+1)-th surface, and "Ni" and "vi" respectively denote a refractive index and an Abbe number with respect to d-line light.

In each of the numerical examples, two surfaces closest to the image side constitutes an optical block FI.

An aspherical shape is expressed by the following equation:

$$x = (h^2/R)\big/\left[1 + [1 - (1+k)(h/R)^2]^{1/2}\right] + Ah^2 + Bh^4 + Ch^6 + Dh^8 + Eh^{10}$$

where "x" designates a displacement from a surface vertex along the optical axis in a position at a height "h" from the optical axis, "k" designates a conic constant, each of "A", "B", "C", "D", and "E" is an aspheric coefficient corresponding to an associated order, and "R" designates a paraxial radius of curvature.

Additionally, "e-0X" means "×$10^{-X}$". Further, "f", "Fno", and "ω" represent a focal length, an F-number, and a semi-field angle, respectively.

Furthermore, Table 2 shows the relationship between the conditional expressions (1) to (3) and numerical values in the following numerical examples 1 to 3.

Numerical Example 1
f = 4.72-17.31 Fno = 2.51-4.50 2ω = 73.9°-23.2°

| R1 = 15.565 | D1 = 5.20 | N1 = 1.48749 | v1 = 70.2 |
| R2 = 209.071 | D2 = variable | | |
| *R3 = −50.484 | D3 = 1.00 | N2 = 1.85961 | v2 = 40.3 |
| R4 = 9.037 | D4 = 2.56 | | |
| R5 = ∞ | D5 = 8.00 | N3 = 1.77250 | v3 = 49.6 |
| R6 = ∞ | D6 = 0.95 | | |
| R7 = −15.718 | D7 = 0.50 | N4 = 1.83481 | v4 = 42.7 |
| R8 = 9.917 | D8 = 0.46 | | |
| R9 = 11.851 | D9 = 1.90 | N5 = 1.84666 | v5 = 23.9 |
| R10 = −24.411 | D10 = variable | | |
| R11 = stop | D11 = 0.50 | | |
| *R12 = 5.968 | D12 = 1.70 | N6 = 1.69350 | v6 = 53.2 |
| R13 = −26.051 | D13 = 0.12 | | |
| R14 = 6.415 | D14 = 1.60 | N7 = 1.69680 | v7 = 55.5 |
| R15 = 182.351 | D15 = 0.50 | N8 = 1.84666 | v8 = 23.9 |
| R16 = 3.502 | D16 = variable | | |
| *R17 = 10.689 | D17 = 2.00 | N9 = 1.73077 | v9 = 40.5 |
| R18 = −34.695 | D18 = 1.50 | | |
| R19 = ∞ | D19 = 1.25 | N10 = 1.51633 | v10 = 64.1 |
| R20 = ∞ | | | |

| | Focal Length | | |
|---|---|---|---|
| Variable Interval | 4.72 | 13.54 | 17.31 |
| D2 | 0.90 | 5.89 | 6.71 |
| D10 | 11.50 | 2.07 | 0.63 |
| D16 | 6.87 | 15.45 | 18.83 |

Aspheric Coefficients

| 3rd Surface | k = −4.23949e+001 | A = 0.00000e+000 | B = 1.42820e−004 |
| | C = −1.19268e−006 | D = 5.47717e−009 | E = −2.94385e−012 |
| 12th Surface | k = −2.05313e+000 | A = 0.00000e+000 | B = 5.58921e−004 |
| | C = 7.98734e−006 | D = −3.86674e−006 | E = 2.43428e−007 |
| 17th Surface | k = 5.46772e−001 | A = 0.00000e+000 | B = −2.72057e−004 |
| | C = 7.02856e−006 | D = −6.64417e−007 | E = 1.37919e−008 |

Numerical Example 2
f = 4.72-47.00 Fno = 2.83-5.70 2ω = 73.8°-8.6°

| R1 = 38.973 | D1 = 1.40 | N1 = 1.84666 | v1 = 23.9 |
| R2 = 30.798 | D2 = 4.50 | N2 = 1.48749 | v2 = 70.2 |
| R3 = 122.673 | D3 = 0.15 | | |
| R4 = 51.633 | D4 = 3.00 | N3 = 1.48749 | v3 = 70.2 |

-continued

| | | | |
|---|---|---|---|
| R5 = −1754.434 | D5 = variable | | |
| R6 = 90.693 | D6 = 1.00 | N4 = 1.88300 | v4 = 40.8 |
| R7 = 10.669 | D7 = 4.00 | | |
| R8 = ∞ | D8 = 16.00 | N5 = 1.77250 | v5 = 49.6 |
| R9 = ∞ | D9 = 1.72 | | |
| R10 = −22.899 | D10 = 0.80 | N6 = 1.88300 | v6 = 40.8 |
| R11 = 10.079 | D11 = 2.51 | N7 = 1.84666 | v7 = 23.9 |
| R12 = −67.220 | D12 = variable | | |
| R13 = stop | D13 = 0.50 | | |
| *R14 = 6.982 | D14 = 2.20 | N8 = 1.69350 | v8 = 53.2 |
| *R15 = −93.887 | D15 = 0.12 | | |
| R16 = 6.533 | D16 = 1.70 | N9 = 1.70000 | v9 = 48.1 |
| R17 = −345.297 | D17 = 0.50 | N10 = 1.80518 | v10 = 25.4 |
| R18 = 4.388 | D18 = variable | | |
| R19 = −4.814 | D19 = 0.80 | N11 = 1.59270 | v11 = 35.3 |
| R20 = −8.501 | D20 = variable | | |
| *R21 = −329.800 | D21 = 2.50 | N12 = 1.73077 | v12 = 40.5 |
| *R22 = −7.419 | D22 = 1.50 | | |
| R23 = ∞ | D23 = 1.20 | N13 = 1.51633 | v13 = 64.1 |
| R24 = ∞ | | | |

| | Focal Length | | |
|---|---|---|---|
| Variable Interval | 4.72 | 20.18 | 47.00 |
| D5 | 0.50 | 20.41 | 30.19 |
| D12 | 20.35 | 6.37 | 0.53 |
| D18 | 8.31 | 11.74 | 19.73 |
| D20 | 0.05 | 4.76 | 2.21 |

| Aspheric Coefficients | | | |
|---|---|---|---|
| 14th Surface | k = −2.24473e+000<br>C = 1.12793e−005 | A = 0.00000e+000<br>D = 4.60802e−007 | B = 9.14803e−004<br>E = 1.23365e−007 |
| 15th Surface | k = 7.96496e+001<br>C = 2.07949e−005 | A = 0.00000e+000<br>D = 3.35953e−007 | B = 5.84958e−004<br>E = 2.42783e−007 |
| 21st Surface | k = −3.71416e+006<br>C = −3.65360e−005 | A = 0.00000e+000<br>D = 2.12651e−006 | B = 6.20063e−004<br>E = −7.06009e−008 |
| 22nd Surface | k = −5.42295e+000<br>C = 1.60929e−005 | A = 0.00000e+000<br>D = −2.79043e−007 | B = −2.67263e−004<br>E = −2.22830e−008 |

Numerical Example 3
f = 4.72-25.35 Fno = 2.88-5.70 2ω = 73.9°-15.9°

| | | | |
|---|---|---|---|
| R1 = 41.094 | D1 = 1.40 | N1 = 1.84666 | v1 = 23.9 |
| R2 = 31.826 | D2 = 4.27 | N2 = 1.60311 | v2 = 60.6 |
| R3 = −1115.121 | D3 = variable | | |
| R4 = 42.048 | D4 = 1.00 | N3 = 1.88300 | v3 = 40.8 |
| R5 = 9.626 | D5 = 4.60 | | |
| R6 = ∞ | D6 = 13.00 | N4 = 1.77250 | v4 = 49.6 |
| R7 = ∞ | D7 = 1.50 | | |
| R8 = −29.360 | D8 = 0.80 | N5 = 1.88300 | v5 = 40.8 |
| R9 = 9.947 | D9 = 2.52 | N6 = 1.84666 | v6 = 23.9 |
| R10 = −82.211 | D10 = variable | | |
| R11 = stop | D11 = 0.50 | | |
| *R12 = 7.020 | D12 = 2.00 | N7 = 1.69350 | v7 = 53.2 |
| *R13 = −51.680 | D13 = 0.12 | | |
| R14 = 5.928 | D14 = 1.70 | N8 = 1.70000 | v8 = 48.1 |
| R15 = 245.373 | D15 = 0.50 | N9 = 1.80518 | v9 = 25.4 |
| R16 = 3.935 | D16 = variable | | |
| R17 = −5.344 | D17 = 0.80 | N10 = 1.59270 | v10 = 35.3 |
| R18 = −8.824 | D18 = variable | | |
| *R19 = −1068.095 | D19 = 2.30 | N11 = 1.73077 | v11 = 40.5 |
| *R20 = −9.800 | D20 = 1.50 | | |
| R21 = ∞ | D21 = 1.20 | N12 = 1.51633 | v12 = 64.1 |
| R22 = ∞ | | | |

| | Focal Length | | |
|---|---|---|---|
| Variable Interval | 4.72 | 15.08 | 25.35 |
| D3 | 0.50 | 17.95 | 24.42 |
| D10 | 17.89 | 5.06 | 1.66 |
| D16 | 5.11 | 8.02 | 10.13 |
| D18 | 0.45 | 4.57 | 7.14 |

| Aspheric Coefficients | | | |
|---|---|---|---|
| 12th Surface | k = −2.30595e+000<br>C = 1.07097e−005 | A = 0.00000e+000<br>D = 7.26909e−007 | B = 8.27907e−004<br>E = 6.74461e−007 |
| 13th Surface | k = 1.03854e+002<br>C = 3.12276e−005 | A = 0.00000e+000<br>D = −9.53203e−000 | B = 4.93684e−004<br>E = 2.05246e−007 |
| 19th Surface | k = −3.71416e+006<br>C = −1.88815e−005 | A = 0.00000e+000<br>D = 9.79652e−007 | B = −3.00095e−005<br>E = −3.07789e−008 |
| 20th Surface | k = −5.57356e+000<br>C = 2.71176e−005 | A = 0.00000e+000<br>D = −8.10283e−007 | B = −7.28724e−004<br>E = −3.89311e−010 |

TABLE 2

| Conditional Expression | | Numerical Example 1 | Numerical Example 2 | Numerical Example 3 |
|---|---|---|---|---|
| (1) | |Fw/FFw| | 0.431 | 0.452 | 0.413 |
| (2) | Fw/FRw | 0.406 | 0.284 | 0.372 |
| (3) | FW/PFL | 0.415 | 0.456 | 0.349 |

In the above embodiments, the zoom lens that is mountable to the imaging apparatus or a unit combining the zoom lens and an image sensor (photoelectric conversion element, such as CCD, CMOS) were described. Next, the imaging apparatus (a camera or video camera with which the zoom lens is mounted) is described. Here, a digital compact camera of the lens shutter type is described as an image pickup apparatus according to an exemplary embodiment of the present invention with reference to FIG. 17. However, the zoom lens of the embodiments or the unit combining the zoom lens and the image sensor is applicable not only to the digital compact camera but the image pickup apparatus at large. In addition, the zoom lens is applicable to a finder of a single-lens reflex camera, an interchangeable lens for the single-lens reflex camera, or various image pickup apparatuses.

As illustrated in FIG. 17, the digital compact camera of the lens shutter type includes a digital camera body 10, an optical system 11 according to an exemplary embodiment of the present invention, a flash unit 12 incorporated into the camera body 12, an external viewfinder 13, and a shutter button 14. FIG. 17 also schematically illustrates an arrangement 15 of optical members of the optical system 11, which are provided in the camera body 10.

Thus, a high-optical-performance compact image pickup apparatus having a thin camera body is implemented by applying an image pickup apparatus according to an exemplary embodiment of the present invention to a digital camera.

Although the optical system 11 is located such that an optical axis deflected by a reflecting member is directed in a vertical direction at a landscape photographing position, the optical system 11 can be located such that the deflected optical axis is directed in a horizontal direction.

According to the above-described exemplary embodiments, an image pickup apparatus is implemented, which can simplify a moving mechanism for moving lens units during zooming, and which can easily miniaturize the entire optical system.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-328098 filed Dec. 5, 2006, which is hereby incorporated by reference herein in its entirety.

What is claimed is:

1. An image pickup apparatus comprising:
an image pickup element; and
an optical system configured to form an image on the image pickup element, the optical system comprising, in order from an object side to an image side:
a first lens unit having a positive refractive power;
a second lens unit having a negative refractive power and including a reflecting member configured to deflect an optical axis; and
a rear lens unit having a positive refractive power and including at least one lens unit having a positive refractive power,
wherein the second lens unit is stationary for zooming,
wherein, during zooming, the image pickup element moves, and an interval between the first lens unit and the second lens unit and an interval between the second lens unit and the rear lens unit vary, and
wherein a composite focal length (FFw) of the first lens unit and the second lens unit at a wide-angle end, a focal length (FRw) of the rear lens unit at the wide-angle end, and a focal length (Fw) of the optical system at the wide-angle end satisfy the following conditions:

$0.3<|Fw/FFw|<0.6$, and $0.2<Fw/FRw<0.6$.

2. The image pickup apparatus according to claim 1, wherein the rear lens unit includes a lens member having a positive refractive power, being located within a distance of $1.5 \times LD$ in terms of an air conversion length from the image pickup element, and moving integrally with the image pickup element, where LD denotes a diagonal length of an effective image plane of the image pickup element.

3. The image pickup apparatus according to claim 2, wherein a focal length (PFL) of the lens member and a focal length (Fw) of the optical system at a wide-angle end satisfy the following condition:

$0.25<Fw/PFL<0.55$.

4. The image pickup apparatus according to claim 1, wherein the rear lens unit includes, in order from the object side to the image side:
a third lens unit having a positive refractive power; and
a fourth lens unit having a positive refractive power,
wherein, during zooming, the third lens unit moves, and the fourth lens unit moves integrally with the image pickup element.

5. The image pickup apparatus according to claim 1, wherein the rear lens unit includes, in order from the object side to the image side:
a third lens unit having a positive refractive power;
a fourth lens unit having a negative refractive power; and
a fifth lens unit having a positive refractive power,
wherein, during zooming, the third lens unit and the fourth lens unit move, and the fifth lens unit moves integrally with the image pickup element.

6. A zoom lens mountable on an image pickup apparatus including an image pickup element that is movable during zooming, the zoom lens comprising, in order from an object side to an image side:
a first lens unit having a positive refractive power;
a second lens unit having a negative refractive power and including a reflecting member configured to deflect an optical axis; and
a rear lens unit having a positive refractive power and including at least one lens unit having a positive refractive power,
wherein the second lens unit is stationary for zooming, and
wherein, during zooming, the image pickup element moves, and an interval between the first lens unit and the second lens unit and an interval between the second lens unit and the rear lens unit vary.

7. The zoom lens according to claim 6, wherein a composite focal length (FFw) of the first lens unit and the second lens unit at a wide-angle end, a focal length (FRw) of the rear lens unit at the wide-angle end, and a focal length (Fw) of the zoom lens at the wide-angle end satisfy the following conditions:

$0.3<|Fw/FFw|<0.6$, and $0.2<Fw/FRw<0.6$.

8. The zoom lens according to claim 6, wherein the rear lens unit includes a lens member having a positive refractive power, being located within a distance of $1.5 \times LD$ in terms of an air conversion length from the image pickup element, and moving integrally with the image pickup element, where LD denotes a diagonal length of an effective image plane of the image pickup element.

9. The zoom lens according to claim 8, wherein a focal length (PFL) of the lens member and a focal length (Fw) of the zoom lens at a wide-angle end satisfy the following condition:

$0.25<Fw/PFL<0.55$.

10. The zoom lens according to claim 6, wherein the rear lens unit includes, in order from the object side to the image side:
a third lens unit having a positive refractive power; and
a fourth lens unit having a positive refractive power,
wherein, during zooming, the third lens unit moves, and the fourth lens unit moves integrally with the image pickup element.

11. The zoom lens according to claim 6, wherein the rear lens unit includes, in order from the object side to the image side:
a third lens unit having a positive refractive power;
a fourth lens unit having a negative refractive power; and
a fifth lens unit having a positive refractive power,
wherein, during zooming, the third lens unit and the fourth lens unit move, and the fifth lens unit moves integrally with the image pickup element.

12. An image pickup apparatus comprising:
an image pickup element; and
an optical system configured to form an image on the image pickup element, the optical system comprising, in order from an object side to an image side:
a first lens unit having a positive refractive power;
a second lens unit having a negative refractive power and including a reflecting member configured to deflect an optical axis; and
a rear lens unit having a positive refractive power and including at least one lens unit having a positive refractive power,
wherein the second lens unit is stationary for zooming,
wherein, during zooming, the image pickup element moves, and an interval between the first lens unit and the second lens unit and an interval between the second lens unit and the rear lens unit vary, and wherein the rear lens unit includes a lens member having a positive refractive power, being located within a distance of 1.5×LD in terms of an air conversion length from the image pickup element, and moving integrally with the image pickup element, where LD denotes a diagonal length of an effective image plane of the image pickup element.

13. An image pickup apparatus comprising:

an image pickup element; and an optical system configured to form an image on the image pickup element, the optical system comprising, in order from an object side to an image side:

a first lens unit having a positive refractive power;

a second lens unit having a negative refractive power and including a reflecting member configured to deflect an optical axis; and a rear lens unit having a positive refractive power and including at least one lens unit having a positive refractive power, wherein the second lens unit is stationary for zooming, wherein, during zooming, the image pickup element moves, and an interval between the first lens unit and the second lens unit and an interval between the second lens unit and the rear lens unit vary, wherein the rear lens unit includes a lens member having a positive refractive power, being located within a distance of 1.5×LD in terms of an air conversion length from the image pickup element, and moving integrally with the image pickup element, where LD denotes a diagonal length of an effective image plane of the image pickup element, and wherein a focal length (PFL) of the lens member and a focal length (Fw) of the optical system at a wide-angle end satisfy the following condition:

$0.25 < Fw/PFL < 0.55$.

14. An image pickup apparatus comprising:

an image pickup element; and an optical system configured to form an image on the image pickup element, the optical system comprising, in order from an object side to an image side:

a first lens unit having a positive refractive power;

a second lens unit having a negative refractive power and including a reflecting member configured to deflect an optical axis; and a rear lens unit having a positive refractive power and including at least one lens unit having a positive refractive power, wherein the second lens unit is stationary for zooming, wherein, during zooming, the image pickup element moves, and an interval between the first lens unit and the second lens unit and an interval between the second lens unit and the rear lens unit vary, wherein the rear lens unit includes, in order from the object side to the image side:

a third lens unit having a positive refractive power; and a fourth lens unit having a positive refractive power, wherein, during zooming, the third lens unit moves, and the fourth lens unit moves integrally with the image pickup element.

15. An image pickup apparatus comprising:

an image pickup element; and an optical system configured to form an image on the image pickup element, the optical system comprising, in order from an object side to an image side:

a first lens unit having a positive refractive power;

a second lens unit having a negative refractive power and including a reflecting member configured to deflect an optical axis; and a rear lens unit having a positive refractive power and including at least one lens unit having a positive refractive power, wherein the second lens unit is stationary for zooming, wherein, during zooming, the image pickup element moves, and an interval between the first lens unit and the second lens unit and an interval between the second lens unit and the rear lens unit vary, wherein the rear lens unit includes, in order from the object side to the image side:

a third lens unit having a positive refractive power;

a fourth lens unit having a negative refractive power; and a fifth lens unit having a positive refractive power, wherein, during zooming, the third lens unit and the fourth lens unit move, and the fifth lens unit moves integrally with the image pickup element.

* * * * *